United States Patent [19]

Phillips

[11] 4,157,231

[45] Jun. 5, 1979

[54] HYDRAULIC DRILL UNIT

[75] Inventor: Joseph L. Phillips, Beaux Arts Village, Wash.

[73] Assignee: The United States of America as represented by the Secretary of the Air Force, Washington, D.C.

[21] Appl. No.: 837,330

[22] Filed: Sep. 27, 1977

[51] Int. Cl.² .................. B23B 35/00; B23B 47/18
[52] U.S. Cl. .................. 408/1 R; 408/9; 408/11; 408/13; 408/16
[58] Field of Search ............ 408/1, 9, 11, 13, 16; 82/2 B, 1 C

[56] References Cited

U.S. PATENT DOCUMENTS

| | | | |
|---|---|---|---|
| 3,174,367 | 3/1965 | Lukens | 82/2 B |
| 3,259,023 | 7/1966 | Rieger et al. | 408/11 |
| 3,754,487 | 8/1973 | Nachtigal | 82/1 C |

Primary Examiner—Leonidas Vlachos
Attorney, Agent, or Firm—Joseph E. Rusz; Richard J. Killoren

[57] ABSTRACT

A hydraulic drill unit for drilling multimaterial, thick layer stock having a conventional hydraulic drill modified to have its feed controlled by a servo valve and its spindle speed controlled by a servo valve. A linear encoder is attached to the drill to provide an indication of drill position. The linear encoded provides 20,000 forward and reverse pulses per inch, depending upon the direction of travel, which are used to determine net feed rate. The net feed rate signal is compared with a command feed rate to control the feed servo valve. A magnetic pickup is used to provide a pulse signal proportional to RPM. This signal is compared with a command speed signal to control the spindle speed servo valve. Differential pressure transducers are used to measure pressure across the hydraulic feed pistion and the hydraulic drill motor to provide signals which can be used as indications of chip packing or a dull drill. Displays are provided to indicate Torque, Thrust, RPM, Inches of travel per revolution and relative displacement of the drill. These displays are used for the manual control of the drill. Torque, Thrust, RPM and absolute displacement information is supplied to a computer for the automatic operation of the hydraulic drill. Since optimized speeds and feeds are generally known for specific drill diameters and materials, this information has been programmed into the computer to provide the command feed and command speed levels for the various materials in a stack to provide the error signals for controlling the feed and speed servo valves. Torque and Thrust buildup are used by the computer for indications of chip packing or dull drill. Four solenoid valves are used to provide rapid advancement and rapid retraction of the drill.

6 Claims, 17 Drawing Figures

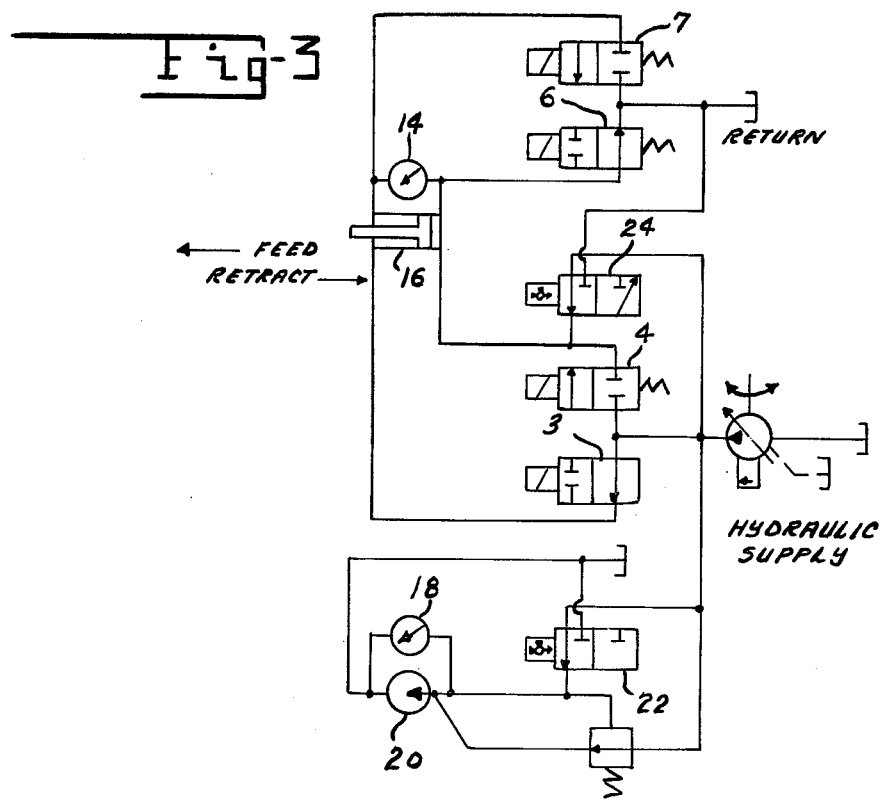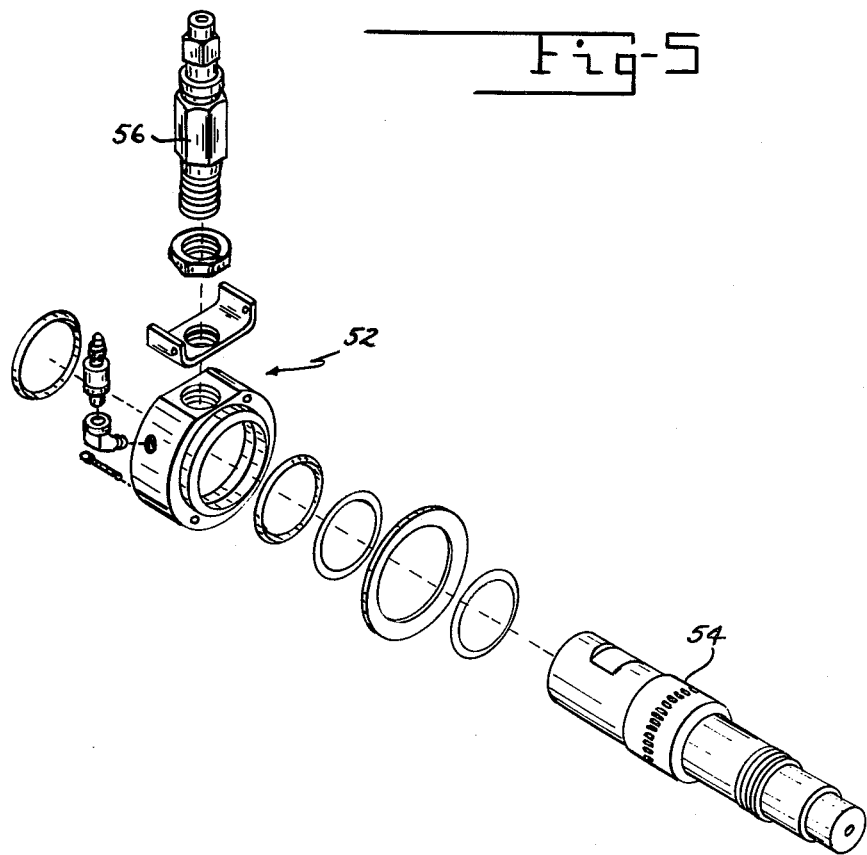

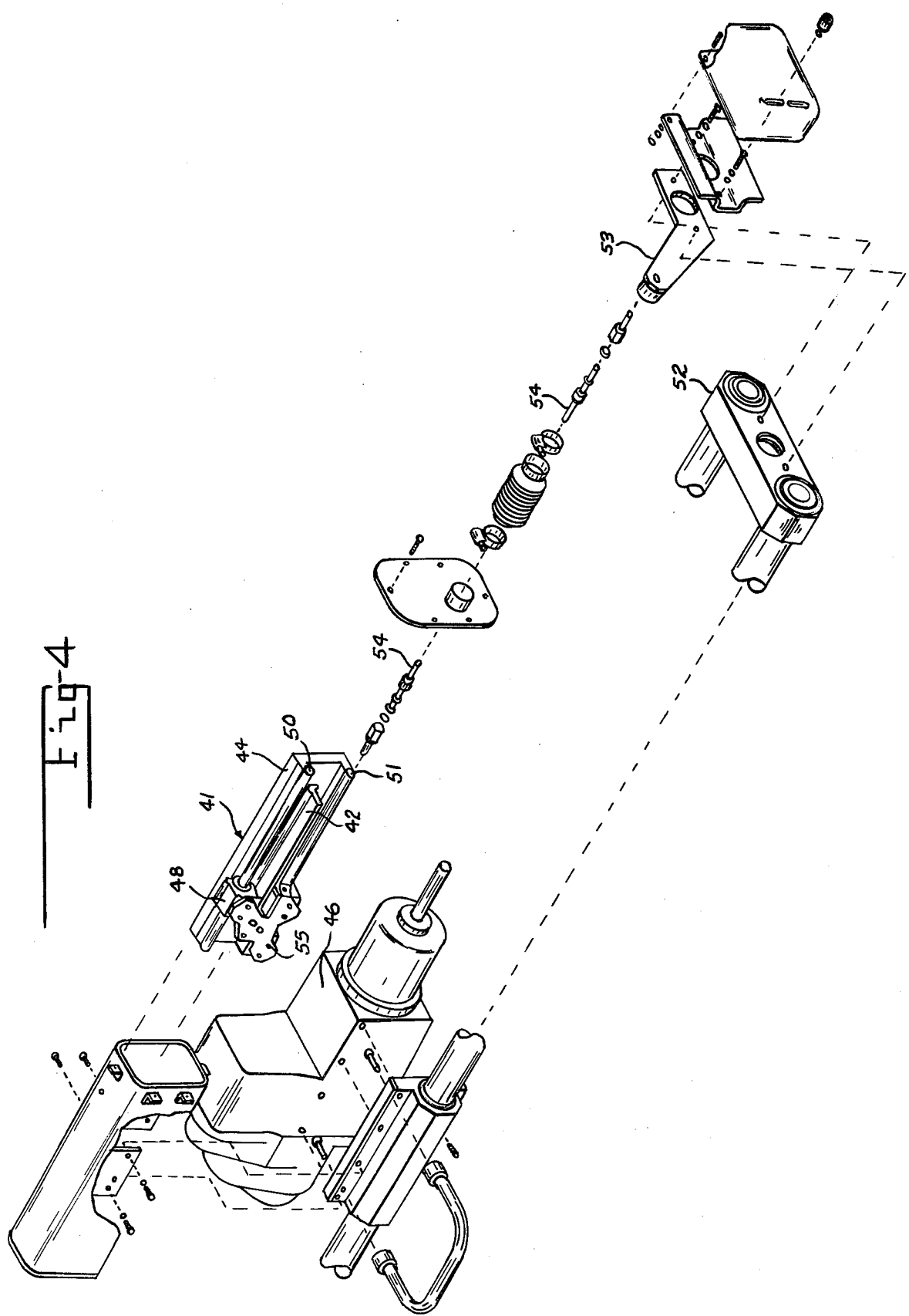

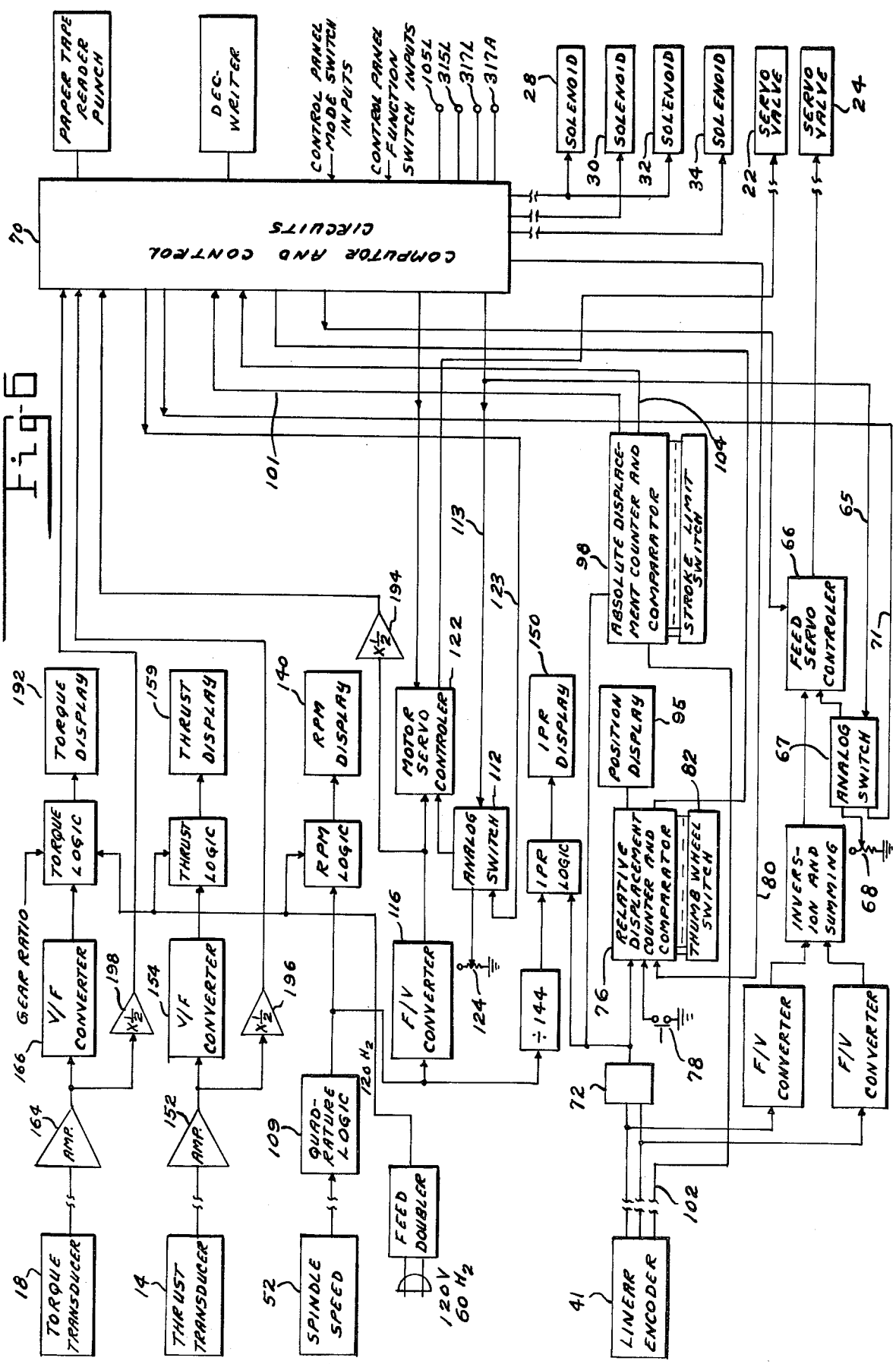

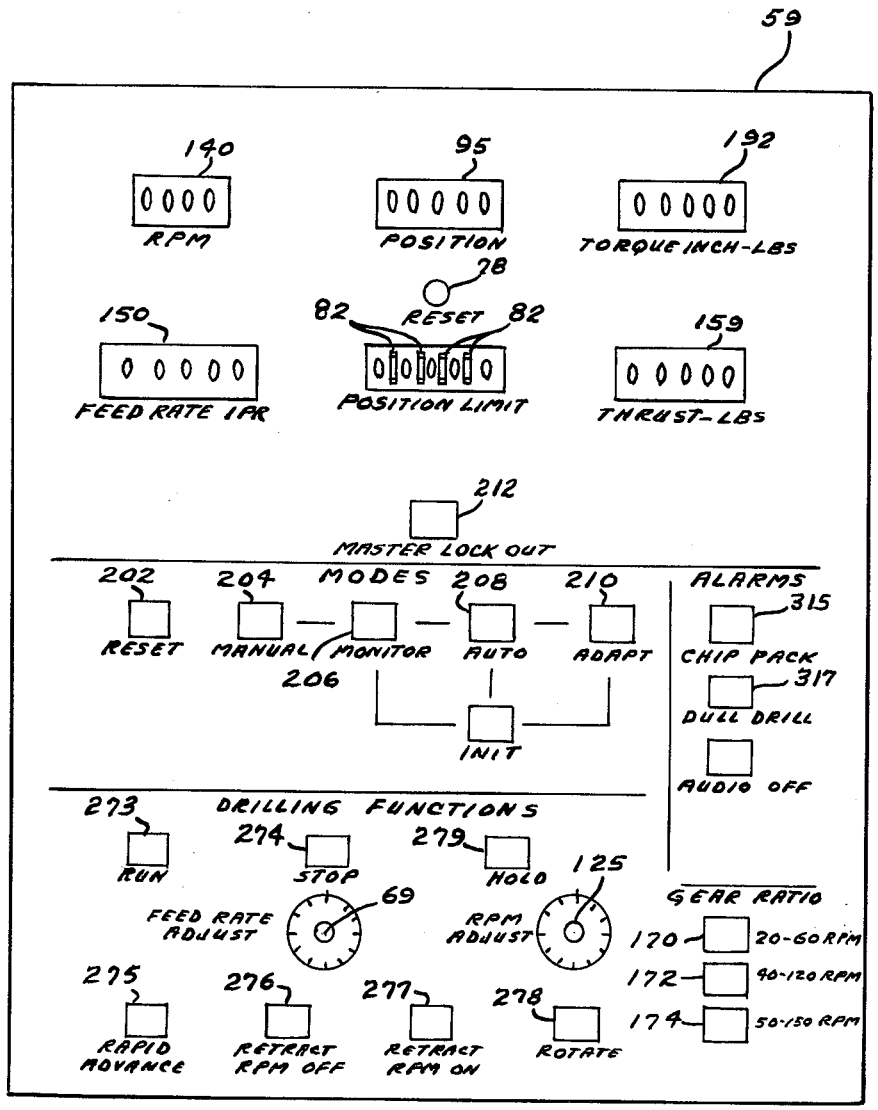

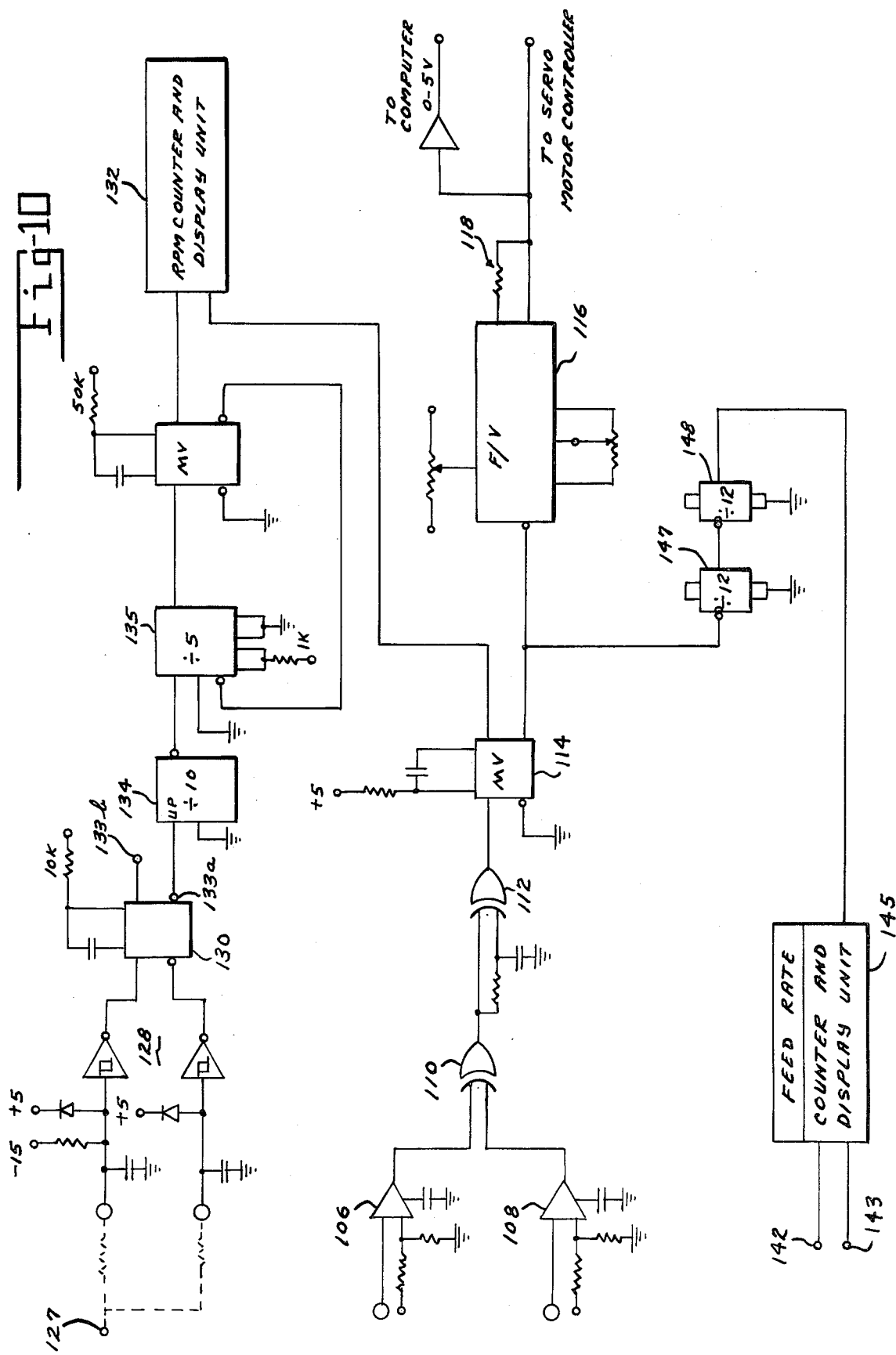

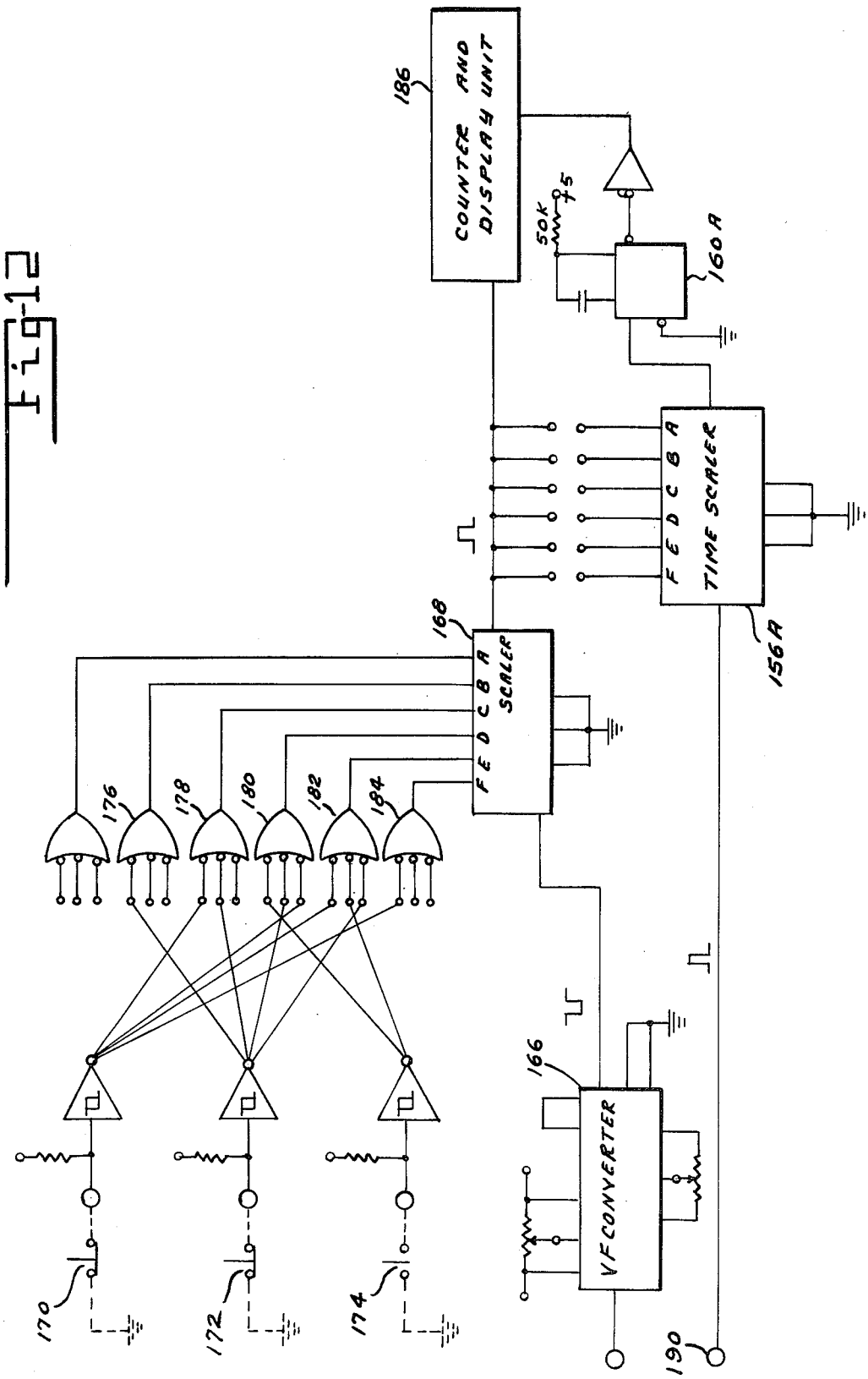

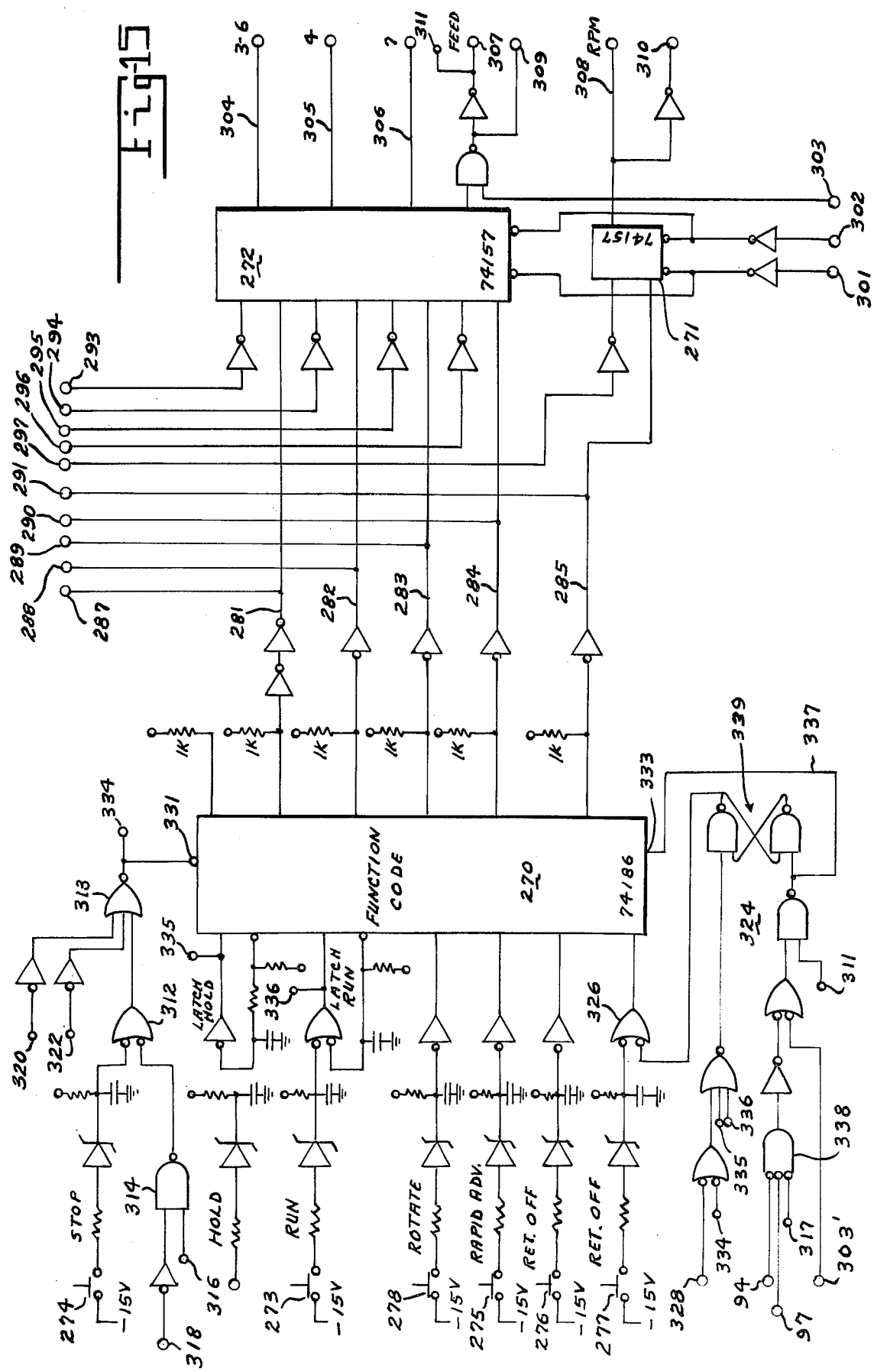

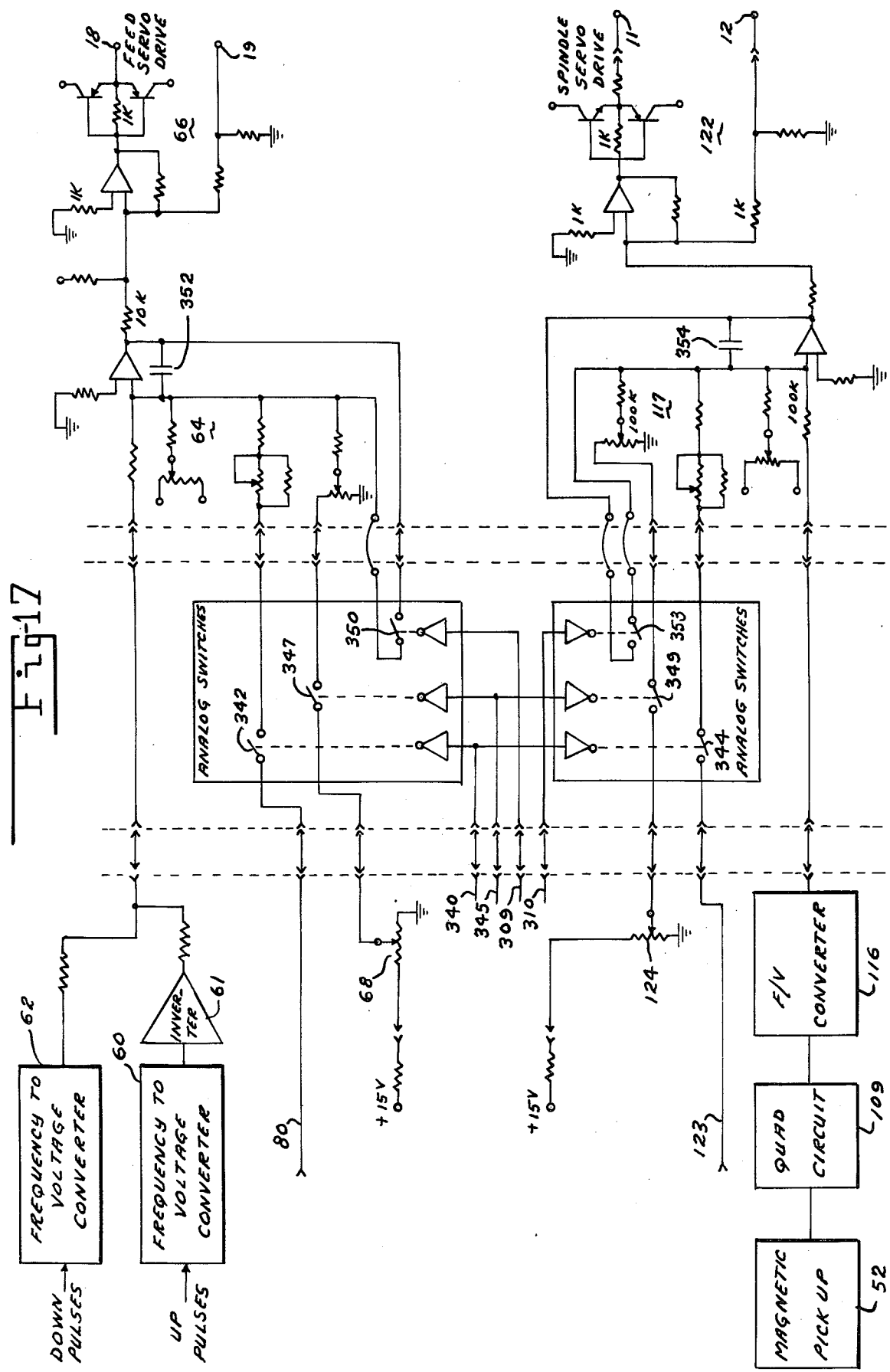

HYDRAULIC DRILL UNIT

RIGHTS OF THE GOVERNMENT

The invention described herein may be manufactured and used by or for the Government of the United States for all governmental purposes without the payment of any royalty.

BACKGROUND OF THE INVENTION

This invention relates to a hydraulic drill unit for drilling multimaterial, thick layer stock.

The U.S. Pat. to Rieger et al., No. 3,259,023, discloses a drilling machine wherein the feed and speed rates are varied during the drilling operation.

Most portable drilling equipment for difficult materials or large diameter holes have fixed feed rates and a limited range of speed variations. The feed rates are set for the most difficult materials in the stack. Speed variations to accommodate different materials in the stack have been very difficult and unreliable from hole to hole if the stack thicknesses and material varied since the finite position of the drill point relative to the original drill length and position in the stack is difficult to ascertain.

New drill units have been developed that have the capability to change both speed and feed rates, but the problem of determining precisely when and how much to change from hole to hole for varying conditions still remains.

BRIEF SUMMARY OF THE INVENTION

According to this invention a conventional hydraulic drill is modified to provide outputs of drill speed, drill thrust and torque and to provide an accurate indication of the position of the drill. A linear encoder is attached to the drill which provides 20,000 forward pulses per inch and 20,000 reverse pulses per inch of travel. The pulse signals are converted to voltage signals in frequency to analog converters with the reverse signal being inverted and summed with the forward signal. Since drill vibration will produce both forward and reverse signals, this will provide an analog signal which represents the net feed rate of the feed cylinder. This signal is used with a command signal either from a manually operated potentiometer or a signal from a computer to provide an error signal to control a feed servo valve which controls a feed cylinder of the hydraulic drill.

The forward and reverse signals from the linear encoder are also used to provide a relative position display and an absolute position information to the computer. A zero index signal from the linear encoder is used to reset the absolute position counter.

A magnetic digital pickup is used to provide a signal proportional to RPM. This signal is used with a command signal either from a manually operated potentiometer or a signal from the computer to provide an error signal to control the spindle drive motor. The output of the linear encoder is used in conjunction with the RPM signal to provide an indication of inches per revolution. Known information of optimized speeds and feeds are programmed into the computer to provide the command speed and feed signals for control of the feed servo valve and the spindle motor servo valve.

Thrust measuring and torque measuring differential transducer provide signals to the computer to indicate chip packing and drill dulling. Displays are also provided of these values for use in the manual operation of the drill. Four solenoid valves are provided in the drill feed system for rapid advance and rapid retraction of the drill.

IN THE DRAWINGS

FIG. 3 is a schematic diagram of the hydraulic circuit for the device of FIG. 2.

FIG. 4 is a partially schematic partially cut away expanded view of the device of FIG. 2 showing the linear encoder.

FIG. 5 is a partially schematic expanded view of the drill spindle of the device of FIG. 2 showing the speed sensing apparatus.

FIG. 6 is a schematic block diagram of the control circuit for the device of FIG. 2.

FIG. 7 is a schematic diagram showing the display panel for the device of the invention.

FIG. 10 is a schematic diagram of a speed and feed circuit for the device of FIG. 6.

FIG. 12 is a schematic diagram of a torque circuit for the device of FIG. 6.

FIG. 15 is a schematic diagram of the drill function control circuit for the device of FIG. 6.

FIG. 17 is a schematic diagram of the speed and feed manual and automatic switching for the device of FIG. 6.

DETAILED DESCRIPTION OF THE INVENTION

Figure 1:
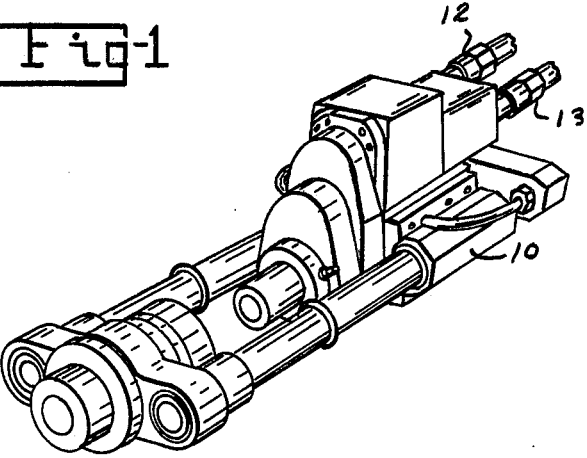
FIG. 1 is an isometric view of a prior art hydraulic drill.
Figure 2:
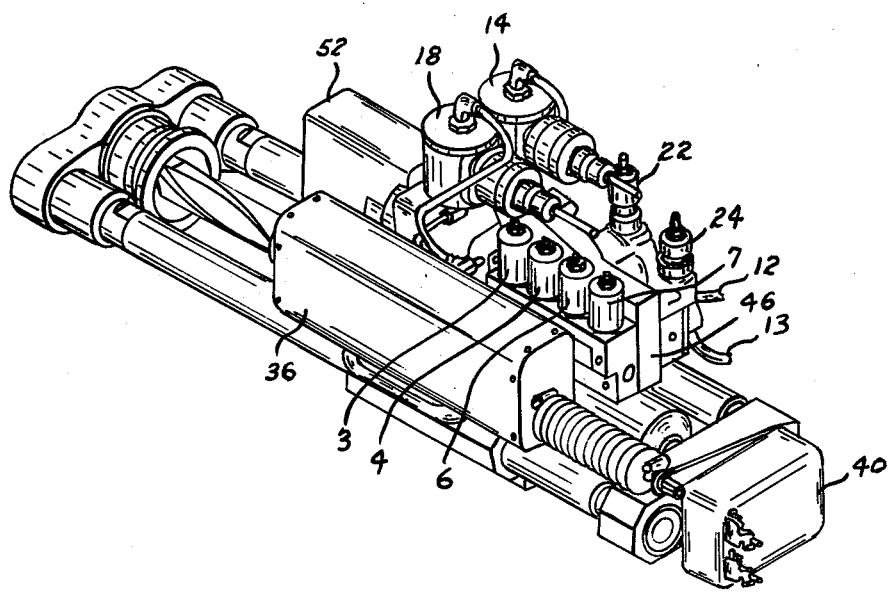
FIG. 2 shows the device of FIG. 1 modified according to this invention.

Reference is now made to FIG. 1 of the drawing which shows a conventional Omark 1-173 hydraulic drill 10, having hydraulic input lines 12 and 13, which is modified according to this invention as shown in FIG. 2.

A thrust measuring differential pressure transducer 14 is used to measure pressure across the hydraulic feed piston 16 as shown in FIG. 3. The transducer 14 used is a Viatran model 220-15 differential pressure transducer and is designed to provide an output voltage proportional to pressure. The transducer has an 0 to 5-V level output for an 0 to 2000 psi pressure. At 2000 psi pressure and a piston area of 1.5 square inch, the drill develops approximately 3000 pounds thrust.

A torque measuring differential pressure transducer 18 is used to measure pressure across the hydraulic drill motor 20, as shown in FIG. 3. A Viatran model 220-15 differential pressure transducer is also used for transducer 18.

The spindle drive is controlled by a servo control valve 22. The valve 22 used is a Moog A076-104 flow control servo valve rated at 15 gallons per minute at 20-mA positive current with its two coils series-connected. The hydraulic flow through the valve is proportional to electrical current from a servo amplifier. At zero drive current the valve is closed, and at a positive drive current a proportional hydraulic flow results. At the design limit for the hydraulic drill of 150 RPM, the flow to the spindle motor is approximately 9 GPM.

The feed cylinder is controlled by a servo control valve 24. The feed servo valve is a Moog model 50-441 servo valve but different from the spindle servo valve in that the feed servo valve is fully closed at 20 mA negative current and fully open at 20 mA positive current.

Rapid advance and rapid retract of the feed cylinder are controlled by four conventional solenoid valves 3, 4, 6 and 7. Valves 3 and 6 are normally open valves and valves 4 and 7 are normally closed valves.

A linear incremental encoder is positioned within housing 36 with its electronic package located in housing 40. The linear incremental encoder used is a Teledyne Gurley model 8715 encoder. The linear incremental encoder, indicated generally at 41 in FIG. 4, has a transparent scale 42, having 1250 lines per inch, mounted on a precision slider 44 which is secured to the drill feed housing 46. The linear encoder has an encoder head 48 which slides on guides 50 and 51 and is secured to frame member 52 by means of arm member 53, connector 54 and bracket 55, shown in the exploded view in FIG. 4.

The linear encoder unit delivers 20,000 forward pulses or 20,000 reverse pulses of 5 volts amplitude per inch of travel depending upon the direction of travel. The 20,000 pulses per inch provides the capability to control feed rates as low as 0.0004 inch per second, equivalent to eight pulses per second from the linear encoder.

A motor speed pickup 52 uses an Airpax model 4-002 digital pickup to sense spindle speed. The pickup produces two square wave outputs offset by 90 degrees at the 36 slots shown at 54, in FIG. 5, rotate past the magnetic pickup 56.

A schematic block diagram for the control for the modified hydraulic drill is shown in FIG. 6. The lines shown represent only control flow paths and any line may represent more than one electrical connector. The drill control and display panel 59, as will be described below, is shown in FIG. 7.

Figure 8:
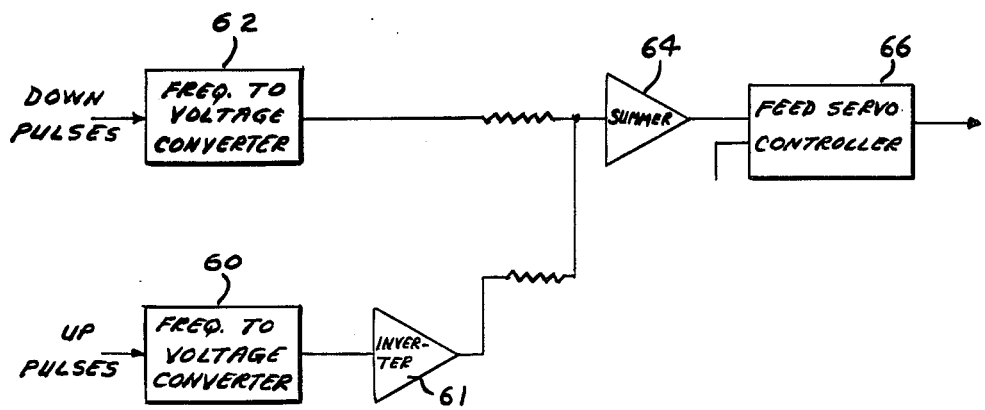
FIG. 8 is a schematic diagram of the feed circuit for the device of FIG. 6.

For the feed control for the converter, the up and down outputs of the linear encoder 41 are supplied to frequency to voltage converters 60 and 62, shown in FIG. 8. The frequency to voltage converters used here, as well as others to be described later, were Universal Voltage to Frequency and Frequency to Voltage converters made by Datel Systems, Inc., which can be operated either to convert voltage to frequency or to convert frequency to voltage. These converters provide a 10 volt output with a 10 KHz input or a 10 KHz output with a 10 volt input.

Since vibrations will produce both forward and reverse pulses, the frequency to analog converters 60 and 62 will generate analog signals for each direction of travel. The output signal of the converter 60 is inverted in inverter 61 and summed with the signal from converter 62 in summer 64 to produce an analog signal that represents the net feed rate. The net feed rate signal is then summed with the command feed rate signal, from analog switch 67, as shown in FIG. 6, to provide an error signal in servo amplifier in feed servo controller 66 to drive servo valve 24. The switch 67 supplies a signal to the servo amplifier in controller 66 from a manually operated potentiometer 68, controlled by knob 69 in FIG. 7, during manual operation and on line 71 from the computer, in computer and control 70, during automatic computer control operation.

The outputs of the linear encoder are also used to provide position display information. The 20,000 pulse per inch signals are supplied to a divide by two counter 72 and so that each up and down pulse supplied at terminals 73 and 74 in FIG. 9 into the up/down counter 76 represents 0.0001 inch of displacement. The counter 76 is a 5-decade binary coded decimal up and down counter. The most significant 4 digits of the counter drive a four digit display 95, providing a position readout with a resolution of 0.001 inch. The first digit of the counter is not connected to the display.

The position counter can be reset either by a manual reset 78 or by a signal from the computer, in computer and control circuit 70, on line 80. In the manual mode the operator can reset the counter to zero when the drill has advanced to the surface of the laminated stack to be drilled. In the Auto mode, the counter is reset to zero when the computer senses a thrust buildup of 100 lbs. at the stack surface. Thumb wheel switches 82 are provided on the control panel 59 and are indicated schematically at 84, 86, 88 and 90 in FIG. 9. These can be used by the operator to dial in drill depth limits, typically the thickness of the material being drilled plus the height of the drill point. A comparator indicated generally at 92 compares the depth measurement contained in the counter with the depth dialed in on the thumb wheel switches. When the count exceeds the switch settings, a signal is generated, at output 94, which is used to retract the drill.

The displays used in this device are Dialco Readout Assemblies, made by Dialight Corporation. The displays are gallium phosphide diodes arranged in a seven segment format. The decoder/drive for the display requires four bits of information in an 8-4-2-1 binary coded decimal for each character in the display.

A second, absolute displacement counter 98 provides absolute displacement information. The counter 98 is a 16 bit binary counter for supplying computer information as represented on line 101 for arithmetic purposes and cannot be reset by either the operator or the computer. No display of absolute displacement is provided on the panel 59 in FIG. 7. The linear encoder provides a zero index pulse on line 102 which is used to reset the counter 98 when the drill is fully retracted. Any reading in this counter represents drill displacement from the index point or absolute displacement. The absolute displacement counter contains a comparator and switches 103, as in counter 76, wherein the maximum allowable displacement of the drill can be entered for comparison with the displacement counter as in the device of FIG. 9, to provide an output on line 104 to stop the drill when the absolute limit of travel of the drill is reached. When the drill is fully retracted, the zero index pulse also provides an output on line 104 to stop the drill.

The control of the spindle is provided as shown in FIG. 10. The 36 slots, shown at 54 in FIG. 5, rotate past magnetic pickup 56 to produce two square waves, offset by 90 degrees. The two square waves are received by threshold receivers 106 and 108 in quadrature logic circuit 109, in FIG. 6, with the outputs of the receivers being supplied to an exclusive OR-gate 110 to produce a 72 Hz square wave at a spindle speed of 60 RPM. This signal is supplied to the two inputs of a second exclusive OR-gate 112 which provides an output at each rising and falling edge of the 72 Hz square wave. The output of the second OR-gate 112 is supplied to a one-shot multivibrator 114 which produces 144 pulses per revolution of the width required by the charging circuit within the frequency to voltage converter 116. A 360 K-ohm resistor 118 scales the frequency to voltage converter 116 for a full range +10 volts output at 360 pulses per second corresponding to an input of 150 RPM. The inverted output of the converter 116 is summed directly with the command rate signal, from analog switch 112, in servo amplifier in the Motor Servo Controller 122 to provide an error signal to drive servo valve 22. The motor servo controller used was a Moog 82-310 dc servo controller. The switch 112 supplies a signal, to the servo amplifier in servo controller 122 from the manual potentiometer 124, controlled by knob 125, in FIG. 7, during manual operation and on line 123, from the computer, in computer and control circuit 70, during automatic computer control operation.

In addition to the position information provided on panel 59, displays are also provided for RPM, feed rate, torque and thrust. A 120 Hz pulse signal, derived from a 60 Hz 110 volt AC line, at 127 in FIG. 10 is used to provide a time reference for RPM, torque and thrust displays. The 120 Hz signal is provided in a conventional manner by supplying the 60 Hz signal to two phase shifter and diode circuit 128 which drives multivibrator 130 to provide the 120 Hz signal at terminals 133a and 133b.

The 144 pulse per revolution from one shot multivibrator 114 in FIG. 10 is supplied to a counter and display unit 132 similar to that used in the position display system but without the comparator and switches 82.

The 120 Hz reference signal at 133a is supplied to a divide by 10 counter 134 and then to a second stage divide by 5 counter 135, to provide a reset pulse for the counters of the counter and display unit 132. Hence, the display register is loaded and the counter is reset every 50/120th of a second. If the spindle is turning at 60 RPM then the pulse train to the counter is 144 pulses per second. The time base multiplies 144×50/120 to produce 60 RPM at the display 140 in FIG. 7.

To provide feed rate information, the up and down pulses from the divide by two counters 72 are supplied to inputs 142 and 143 of the feed rate counter and display unit 145.

The 144 pulse per revolution signal from multivibrator 114 is supplied to two divide by twelve counters 147 and 148 to provide a single pulse per revolution signal to transfer the net displacement count from the feed rate counter to the display register and to reset the counter. This then gives a continuous indication of inches traveled per revolution in the IPR display 150 in FIG. 7.

The RPM and IPR displays are used during manual operation to control the potentiometers 68 and 124 to the desired speeds and feeds.

Optimized speeds and feeds are generally known for specific drill diameters and materials. Table 1 gives these values for four materials and four drill sizes. Similar information is also available for reaming. These values are programmed into the computer for automatic operation of the drill. The feed rate is changed to inches/sec for computer operation.

Figure 11:
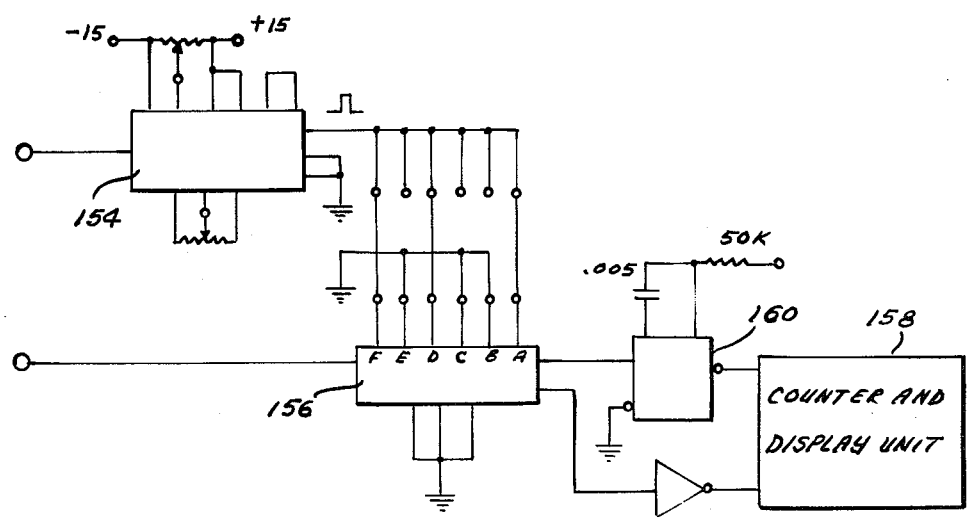
FIG. 11 is a schematic diagram of the thrust circuit for the device of FIG. 6.

The 0-5 V level output of the thrust transducer 14 is supplied to a filtering and X2 scaling amplifier 152 to provide a signal range compatible with the range of the voltage to frequency converter 154. The V/F converter converts the 0-10 V input to an 0-10 KHz pulsed output. Each pulse is 70 μsec wide. The output of the V/F converter 154 is supplied to inputs F, D and A of a 6-bit binary rate multiplier 156 shown in FIG. 11 which accomplishes the necessary scaling.

TABLE 1

Recommended speeds and feeds for Drilling
RECOMMENDED MANUAL SPEEDS AND FEEDS

| MATERIAL | DRILL DIAMETER | | | |
|---|---|---|---|---|
| | ¼" | ¾" | 1" | 1¼" |
| ALUMINUM | 150/.010 | 150/.010 | 150/.010 | 150/.010 |
| TITANIUM | 150/.003 | 100/.004 | 75/.006 | 60/.006 |
| 9NI-4CO | 110/.003 | 70/.003 | 55/.004 | 45/.004 |
| PH 13-8 | 110/.002 | 70/.002 | 55/.002 | 45/.002 |

NOTE: Above values also used in automatic operation.

The binary rate multiplier 156 contains a 6-bit counter that is advanced by the 1-microsecond-120 Hz pulses from terminal 133b in FIG. 10. In the counter, in binary rate multiplier 156, pulses applied at F are gated through on every other count or 32/64 of the time; pulses applied at E are gated through every fourth count or 16/64 of the time; pulses applied to input D are gated through every eight count or 8/64 of the time; those at C are gated through every 16 count or 4/64 of the time; those at B are gated through every 32 count or 2/64 of the time and those at A are gated through every 64 count or 1/64 of the time. Since each pulse represents 1/120th of a second the output provides n/120·V·1000 pulses per unit of time where n is the jumpered scale factor and V is the voltage applied to the V/F converter 154. With the binary rate multiplier 156 jumpered as shown with inputs to terminals F, D and A, the output of the multiplier 156 has pulses for 41/120th of each second. As the counter cycles over from 63 count to zero count, the count that has accumulated in the counter and display unit 158 is dumped into the display register to provide a thrust indication on display 159, in FIG. 7, with the counter reset to zero it can begin accumulating a new count.

Because of the possibility of splitting a 70-microsecond count with +1-microsecond pulse that advances the counter in 156, a one shot multivibrator 160 is employed in the output of binary rate multiplier 156 to restore any split pulses to a single pulse.

The 0-5 V level output of the torque transducer 18 is supplied to a filtering and X2 scaling amplifier 164 as in the thrust circuit.

The output of the voltage to frequency converter 166 in the torque circuit is supplied a binary rate multiplier 168 to provide scale changes in response to front panel switches 170, 172 and 174 that are latched to indicate the gear ratio to the spindle. Outputs from OR-gates 176, 178, 180, 182 and 184 are applied as inputs to the binary rate multiplier 168. The inputs of terminals ABC-DEF determine the ratio of 70 μsec pulses from the V/F converter supplied to the counter and display unit 186. As can be seen from the output of the binary rate multiplier 168 is not applied to any of the terminals A-F of the second binary rate multiplier 156A. When wired in this manner, the second binary rate multiplier only provides the time base by loading the count into the display register and resetting the counter each time the binary rate multiplier 156A cycles over from 63 count to zero count in response to the 120 Hz signal applied to the binary rate multiplier at terminal 190, to provide a torque indication on display 192, on panel 59, in FIG. 7.

In manual operation, the operator can use an increase in the thrust and torque readings on scales 159 and 192 from the values given in the Table 2, to determine chip buildup and dull drill conditions.

TABLE 2

Torque and Thrust for Sharp and Dull Drills at Recommended Speeds and Feeds
PROBABLE TORQUE AND THRUST VALUES
(Displayed)

| | | DRILL DIAMETER | | | | | | | |
|---|---|---|---|---|---|---|---|---|---|
| | | $\frac{1}{4}''$ | | $\frac{3}{4}''$ | | $1''$ | | $1\frac{1}{4}''$ | |
| VALUE | Material | Sharp | Dull | Sharp | Dull | Sharp | Dull | Sharp | Dull |
| | ALUMINUM | 240 | 320 | 300 | 400 | 410 | 530 | 540 | 700 |
| TORQUE | TITANIUM | 200 | 280 | 250 | 340 | 600 | 780 | 750 | 1000 |
| (IN-LB) | 9NI-4CO | 220 | 270 | 260 | 370 | 440 | 740 | 610 | 970 |
| | PH 13-8 | 280 | 265 | 250 | 325 | 330 | 425 | 470 | 580 |
| | ALUMINUM | 230 | 345 | 450 | 675 | 620 | 800 | 750 | 1000 |
| THRUST | TITANIUM | 170 | 760 | 330 | 1150 | 740 | 2040 | 900 | 2400 |
| (LB) | 9NI-4CO | 230 | 620 | 400 | 790 | 800 | 1420 | 1040 | 2200 |
| | PH 13-8 | 320 | 480 | 560 | 840 | 750 | 1125 | 1000 | 1500 |

NOTES:
1. Pertinent only at recommended feeds and speeds.
2. PH 13-8 and aluminum can accept greater wearlands; titanium the least.

Amplifiers 194, 196 and 198 in FIG. 6 are set for a gain of one half for reducing the 0–10 volt range signals from frequency to voltage converter 116 and amplifier 152 and 164 to an 0–5 volt range to produce compatibility with the input range of the computer analog to digital converters in computer and control 70.

Figure 13:
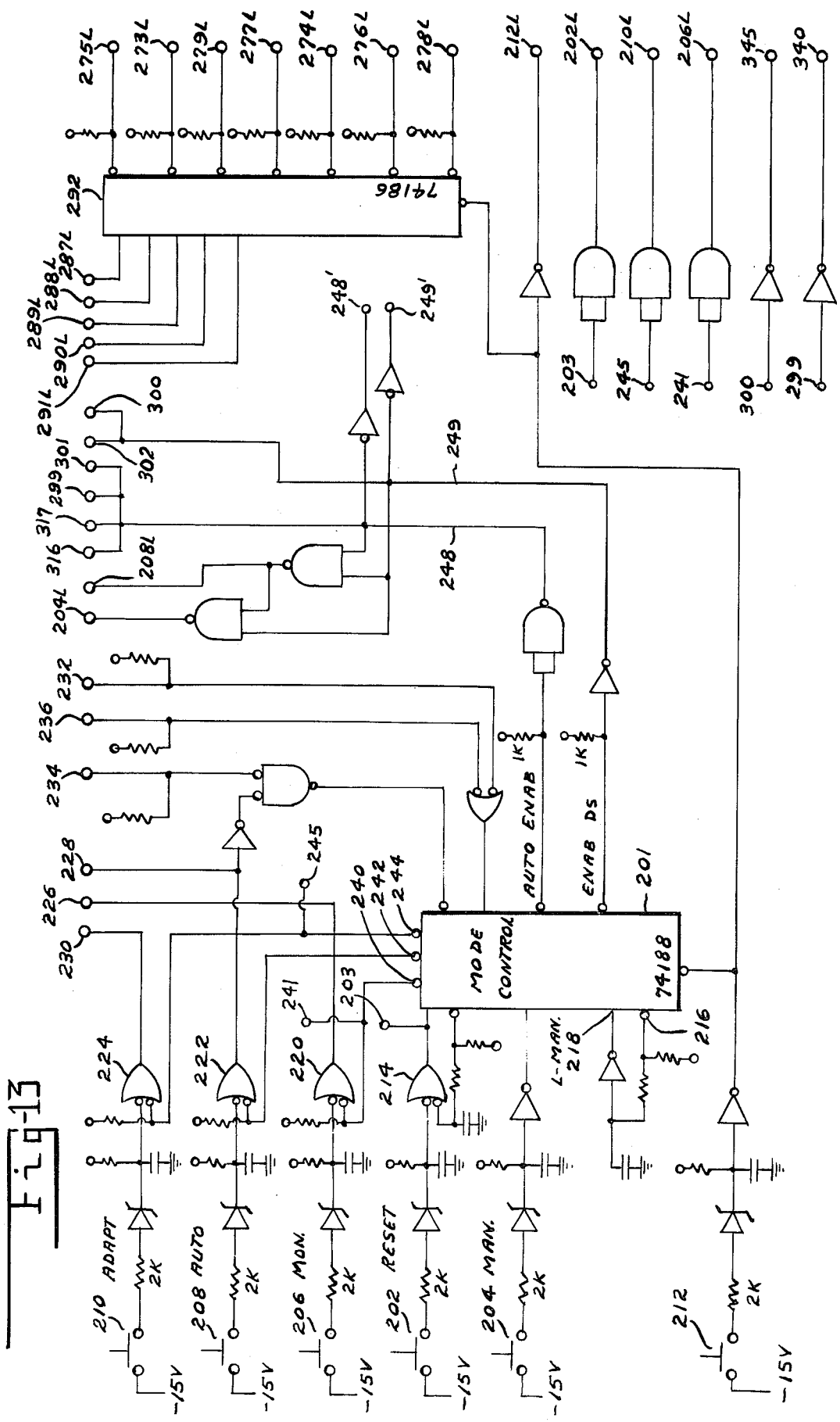
FIG. 13 is a schematic diagram of the drill mode control circuit for the device of FIG. 6.

The drill mode control and drill function control systems which are part of block 70 in FIG. 6 are shown in FIGS. 13 and 15.

Though systems for use in the adapt mode are shown, this mode is non-functioning in the present system and therefore will not be described except in the function of the mode control circuit. The adapt mode system was made available for possible future development of the drill system to provide an adaptive mode of operation.

The mode control logic includes a 74188 programmable read-only memory (ROM) 201 programmed to provide particular output states for selected inputs. The ROM inherently provides switch debouncing and as-wired latching functions for certain conditions.

The switches 202, 204, 206, 208 and 210 are momentary normally open type switches which when depressed supply a negative 15 volts signal to the corresponding noise rejection circuit consisting of two resistors, a zener diode and a capacitor. The master lockout switch 212 totally disables any ROM response to the switches or computer inputs.

The input from the manual switch 204 enters the ROM directly from the noise suppression circuitry. The input from reset switch 202 enters the ROM from the noise suppression circuitry through an OR-gate 214. Reset is latched by an output from the ROM to the second input of OR-gate 214, which holds the reset input to the ROM high when the reset switch is released. The manual mode is latched by an output signal from the ROM at 216 which is inverted and fed back to the ROM at 218 which stays high when the switch is released. Manual and Reset have different latching methods so that manual can be reentered from monitor, which is a submode of manual.

Inputs from the Monitor, Auto and Adapt switches do not enter the ROM but pass through negative NOR-gates 220, 222 and 224 which provide computer inputs at pins 226, 228 and 230. The control computer used is a PDP-11 minicomputer from the Digital Equipment Corporation. The computer is programmed to test the inputs and supplies the appropriate computer action by setting the corresponding acknowledge line high. These lines are shown at 232, 234 and 236. Unless the computer responds appropriately, the ROM prevents any mode change to Monitor, Auto or Adapt. The ROM outputs at 240, 242 and 244 provide corresponding sense inputs to the computer which stay high when the switches are released. A chart showing ROM outputs corresponding to ROM inputs is shown on page 21.

Figure 14:
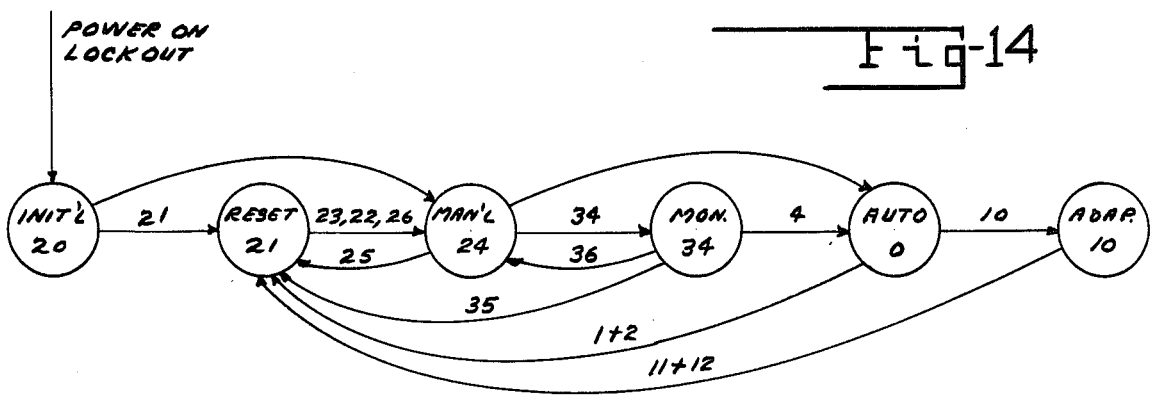
FIG. 14 shows a state diagram for the ROM mode latching in the device of FIG. 13.

The diagram in FIG. 14 with the input corresponding to the octal address numbers in Table 3 shown in the circles. The connecting lines in 14 represent the permissible transitions. The numbers on the lines indicate the ROM inputs as shown on the chart that bring about the transitions.

TABLE 3

| OCTAL ADDRESS | ROM MODE STATE | ROM INPUTS | | | | | | ROM OUTPUTS | | | | | | |
|---|---|---|---|---|---|---|---|---|---|---|---|---|---|---|
| | | ACK AUTO | ADAPMAN | LMAN | MAN | RESET | LADAP | LAUTO | LMON | LMAN | LRESET | ENABDS | AUTOENAB | |
| | ROM PIN NO | 14 | 13 | 12 | 11 | 10 | 9 | 7 | 6 | 5 | 4 | 3 | 2 | 1 |
| X | MASTER LOCKOUT | X | X | X | X | X | X | 1 | 1 | 1 | 1 | 1 | 1 | NOT USED |
| 0 | AUTO | 0 | 0 | 0 | 0 | 0 | 1 | 0 | 1 | 1 | 1 | 0 | 0 | |
| 1 | AUTO EXIT TO RESET | 0 | 0 | 0 | 0 | 1 | 1 | 1 | 1 | 1 | 0 | 1 | 1 | |
| 2 | AUTO EXIT TO RESET | 0 | 0 | 0 | 1 | 0 | 1 | 1 | 1 | 1 | 0 | 1 | 1 | |
| 3 | AUTO EXIT TO RESET | 0 | 0 | 0 | 1 | 1 | 1 | 1 | 1 | 1 | 0 | 1 | 1 | |
| 4 | AUTO ENTRY FROM MAN | 0 | 0 | 1 | 0 | 0 | 1 | 0 | 1 | 1 | 1 | 0 | 0 | |
| 5 | INVALID STATE | 0 | 0 | 1 | 0 | 1 | 1 | 1 | 1 | 1 | 1 | 1 | 1 | |
| 6 | INVALID STATE | 0 | 0 | 1 | 1 | 0 | 1 | 1 | 1 | 1 | 1 | 1 | 1 | |
| 7 | AUTO ADAPTIVE | 0 | 0 | 1 | 1 | 1 | 1 | 0 | 1 | 1 | 1 | 0 | 0 | |
| 10 | AA EXIT TO RESET | 0 | 1 | 0 | 0 | 0 | 1 | 1 | 1 | 1 | 0 | 1 | 1 | |
| 11 | AA EXIT TO RESET | 0 | 1 | 0 | 0 | 1 | 1 | 1 | 1 | 1 | 0 | 1 | 1 | |
| 12 | AA EXIT TO RESET | 0 | 1 | 0 | 1 | 0 | 1 | 1 | 1 | 1 | 0 | 1 | 1 | |
| 13 | AA EXIT TO RESET | 0 | 1 | 0 | 1 | 1 | 1 | 1 | 1 | 1 | 0 | 1 | 1 | |
| 14 | AUTO ENTRY FROM MM | 0 | 1 | 1 | 0 | 0 | 1 | 0 | 1 | 1 | 1 | 0 | 0 | |
| 15 | INVALID STATE | 0 | 1 | 1 | 0 | 1 | 1 | 1 | 1 | 1 | 1 | 1 | 1 | |
| 16 | INVALID STATE | 0 | 1 | 1 | 1 | 0 | 1 | 1 | 1 | 1 | 1 | 1 | 1 | |
| 17 | INVALID STATE | 0 | 1 | 1 | 1 | 1 | 1 | 1 | 1 | 1 | 1 | 1 | 1 | |
| 20 | INITIAL | 1 | 0 | 0 | 0 | 0 | 1 | 1 | 1 | 1 | 1 | 1 | 1 | |
| 21 | RESET | 1 | 0 | 0 | 0 | 1 | 1 | 1 | 1 | 0 | 1 | 1 | 1 | |
| 22 | MAN ENTRY FROM INT'L | 1 | 0 | 0 | 1 | 0 | 1 | 1 | 1 | 0 | 1 | 0 | 1 | |
| 23 | MAN ENTRY FROM RST | 1 | 0 | 0 | 1 | 1 | 1 | 1 | 1 | 0 | 1 | 0 | 1 | |
| 24 | MANUAL | 1 | 0 | 1 | 0 | 0 | 1 | 1 | 1 | 0 | 1 | 0 | 1 | |
| 25 | MAN EXIT TO RESET | 1 | 0 | 1 | 0 | 1 | 1 | 1 | 1 | 1 | 0 | 1 | 1 | |
| 26 | MAN ENTRY | 1 | 0 | 1 | 1 | 0 | 1 | 1 | 1 | 0 | 1 | 0 | 1 | |
| 27 | INVALID REQUEST | 1 | 0 | 1 | 1 | 1 | 1 | 1 | 1 | 1 | 1 | 1 | 1 | |
| 30 | INVALID REQUEST | 1 | 1 | 0 | 0 | 0 | 1 | 1 | 1 | 1 | 1 | 1 | 1 | |
| 31 | INVALID REQUEST | 1 | 1 | 0 | 0 | 1 | 1 | 1 | 1 | 1 | 1 | 1 | 1 | |
| 32 | INVALID REQUEST | 1 | 1 | 0 | 1 | 0 | 1 | 1 | 1 | 1 | 1 | 1 | 1 | |
| 33 | INVALID REQUEST | 1 | 1 | 0 | 1 | 1 | 1 | 1 | 1 | 1 | 1 | 1 | 1 | |
| 34 | MANUAL MONITOR | 1 | 1 | 1 | 0 | 0 | 1 | 1 | 0 | 0 | 1 | 0 | 1 | |
| 35 | MM EXIT TO RESET | 1 | 1 | 1 | 0 | 1 | 1 | 1 | 1 | 1 | 0 | 1 | 1 | |
| 36 | MM EXIT TO MANUAL | 1 | 1 | 1 | 1 | 0 | 1 | 1 | 1 | 0 | 1 | 0 | 0 | |
| 37 | INVALID REQUEST | 1 | 1 | 1 | 1 | 1 | 1 | 1 | 1 | 1 | 1 | 1 | 1 | |

NOTE:
X INDICATES DON'T CARE.

The Auto-Enab output 248 from the ROM controls the drilling state and servo inputs. The DS-Enab output 249 acts to inhibit drill control in modes Reset and Initial.

The function control logic in FIG. 15 includes a 74186 programmable read only memory (ROM) 270 and 74157 data selectors 271 and 272.

The switches 273, 274, 275, 276, 277 and 278 correspond to the buttons shown in FIG. 7. As can be seen from Table 4, Stop, Run and Hold are latched states and the other states are momentary states for the drill and operate only while the corresponding switch button in FIG. 7 is being pressed. The Hold, shown in FIG. 7, is an indicator only and no switch exists for Hold.

RPM Off. Since no pushbutton exists for Hold, Hold cannot be entered directly from either Run or Stop. All of the latching transitions are performed by the programming within the ROM 270 and its inputs. The coding for the ROM 270 is shown in Table 5.

The output lines 281, 282, 283, 284 and 285 of the ROM 270 control the operation of the drill in the manual state. Solenoid valves 3 and 6 control rapid retract and are normally open so that a loss of power to the electronics will force a retraction of the drill. This prevents damage to the material being drilled. With solenoids, 3, 4, 6 and 7 energized, the drill will rapid advance. Valve 7 operates in conjunction with feed servo 24 for advancing the drill at the drilling rates.

TABLE 4

| Drilling FUNCTIONS | DRILL CONTROL LINE STATES | | | | | COMMENTS |
| --- | --- | --- | --- | --- | --- | --- |
| | DS 3.6 | DS 4 | DS 7 | DS FEED | DS RPM | |
| RAPID RETRACT RPM OFF | 0 | 0 | 0 | 0 | 0 | MOMENTARY FUNCTION |
| RAPID RETRACT RPM ON | 0 | 0 | 0 | 0 | 1 | MOMENTARY FUNCTION |
| RAPID ADVANCE | 1 | 1 | 1 | 0 | 0 | MOMENTARY FUNCTION |
| ROTATE | 1 | 0 | 0 | 0 | 1 | MOMENTARY FUNCTION |
| STOP | 1 | 0 | 0 | 0 | 0 | LATCHED FUNCTION |
| RUN | 1 | 0 | 1 | 1 | 1 | LATCHED FUNCTION |
| HOLD | 1 | 0 | 0 | 0 | 1 | LATCHED FUNCTION |

NOTE:
RAPID RETRACT IS FORCED IN MASTER LOCKOUT, INITIAL, AND RESET MODES OR WITH LOSS OF POWER.

Figure 16:
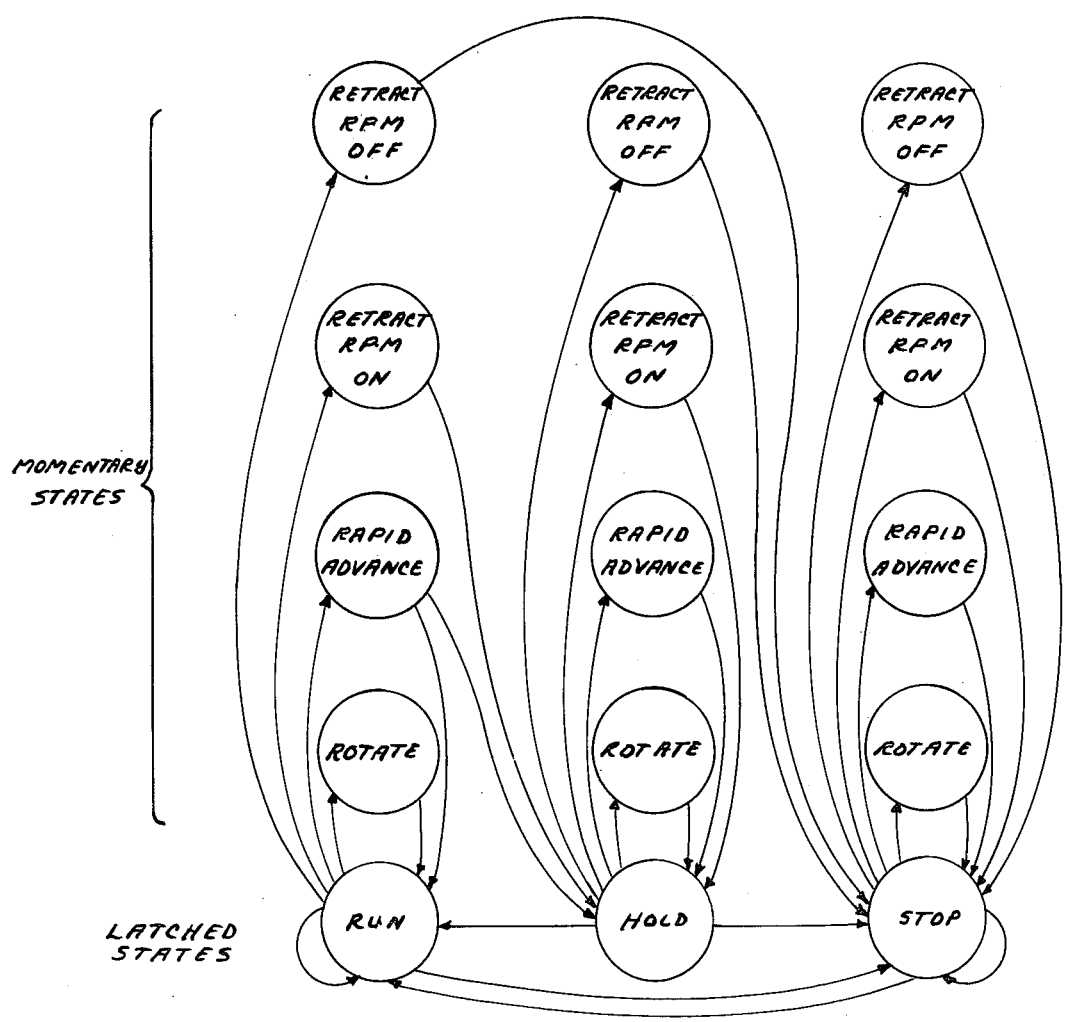
FIG. 16 is the permissible drilling state changes in the circuit of FIG. 15.

FIG. 16 shows the drilling states and the permissible transitions between them. The momentary states are shown three times to clarify the transitions between them. The diagram is read as follows: after a momentary state has been entered from the latched Stop state and the momentary switch has been released, the state will return to Stop; after a momentary state has been entered from the latched Hold state the Hold state will be reentered unless the momentary state was Retract RPM Off, which causes an exit to the Stop state; from the Run state Run will be reentered if the momentary state was Rotate, Hold will be entered if the momentary state was Rapid Advance or Retract RPM On, and Stop will be entered if the momentary state was Retract Lines 287, 288, 289, 290 and 291 provide inputs to the PDP-11 minicomputer and serve as computer request lines in the Auto mode. In the Auto mode controls inputs are provided over lines 293, 294, 295, 296 and 297. Auto Enab and DS-Enab outputs on lines 248 and 249 from FIG. 13 are supplied to terminals 301 and 302, shown in FIGS. 13 and 15, to switch the selectors 271 and 272 between manual and automatic control. An absolute limit signal from line 104 in FIG. 6 is supplied at 303 to stop the drill feed when the absolute drill travel of about 6.528 inches of travel has been reached. This signal is also supplied to terminal 303' as will be described below.

TABLE 5

| OCTAL ADDRESS Desig. | ROM INPUTS | | | | | | ROM OUTPUTS | | | | | | | | Output Code | Functions | Exit |
|---|---|---|---|---|---|---|---|---|---|---|---|---|---|---|---|---|---|
| | RETRACT (ON) Pin 10 F | RETRACT (OFF) Pin 9 E | R. ADVANCE Pin 8 D | ROTATE Pin 5 C | RUN Pin 4 B | HOLD Pin 3 A | RPM 15 Y8 | FEED 16 Y7 | SOL M-7 17 Y6 | SOL M-4 18 Y5 | SOL M-3&6 19 Y4 | UNUSED 20 Y3 | HOLD 21 Y2 | RUN 22 Y1 | | | |
| Disabled | X | X | X | X | X | X | 1 | 1 | 1 | 1 | 1 | 1 | 1 | 1 | 377 | STOP | — |
| 0 | 0 | 0 | 0 | 0 | 0 | 0 | — | — | — | — | — | — | — | — | STOP | — | — |
| 1 | 0 | 0 | 0 | 0 | 0 | 1 | 0 | 1 | 1 | 1 | 1 | 0 | 0 | 1 | 171 | HOLD | — |
| 2 | 0 | 0 | 0 | 0 | 1 | 0 | 0 | 0 | 0 | 1 | 1 | 0 | 1 | 0 | 032 | RUN | — |
| 3 | 0 | 0 | 0 | 0 | 1 | 1 | 0 | 1 | 0 | 1 | 0 | 0 | 1 | 1 | 123 | HOLD | STOP |
| 4 | 0 | 0 | 0 | 1 | 0 | 0 | 0 | 1 | 1 | 1 | 1 | 0 | 1 | 1 | 173 | HOLD | — |
| 5 | 0 | 0 | 0 | 1 | 0 | 1 | 0 | 1 | 1 | 1 | 1 | 0 | 0 | 1 | 171 | HOLD | — |
| 6 | 0 | 0 | 0 | 1 | 1 | 0 | 0 | 0 | 0 | 1 | 1 | 0 | 1 | 0 | 032 | RUN | — |
| 7 | 0 | 0 | 0 | 1 | 1 | 1 | 0 | 0 | 0 | 0 | 0 | 0 | 0 | 0 | 000 | NOT USED | — |
| 10 | 0 | 0 | 1 | 0 | 0 | 0 | 1 | 1 | 0 | 0 | 1 | 0 | 1 | 1 | 313 | R. ADVANCE RPM OFF | STOP |
| 11 | 0 | 0 | 1 | 0 | 0 | 1 | 0 | 1 | 0 | 0 | 1 | 0 | 0 | 1 | 111 | R. ADVANCE RPM ON | HOLD |
| 12 | 0 | 0 | 1 | 0 | 1 | 0 | 0 | 1 | 0 | 0 | 1 | 0 | 0 | 1 | 111 | R. ADVANCE RPM ON | HOLD |
| 13 | 0 | 0 | 1 | 0 | 1 | 1 | 0 | 1 | 0 | 0 | 1 | 0 | 0 | 1 | 111 | R. ADVANCE RPM ON | HOLD |
| 14 | 0 | 0 | 1 | 1 | 0 | 0 | 0 | 0 | 0 | 0 | 0 | 0 | 0 | 0 | 000 | NOT USED | — |
| 15 | 0 | 0 | 1 | 1 | 0 | 1 | 0 | 0 | 0 | 0 | 0 | 0 | 0 | 0 | 000 | NOT USED | — |
| 16 | 0 | 0 | 1 | 1 | 1 | 0 | 0 | 0 | 0 | 0 | 0 | 0 | 0 | 0 | 000 | NOT USED | — |
| 17 | 0 | 0 | 1 | 1 | 1 | 1 | 0 | 0 | 0 | 0 | 0 | 0 | 0 | 0 | 000 | NOT USED | — |
| 20 | 0 | 1 | 0 | 0 | 0 | 0 | 1 | 1 | 1 | 1 | 0 | 0 | 1 | 1 | 363 | RETRACT RPM OFF | STOP |
| 21 | 0 | 1 | 0 | 0 | 0 | 1 | 1 | 1 | 1 | 1 | 0 | 0 | 1 | 1 | 363 | RETRACT RPM OFF | STOP |
| 22 | 0 | 1 | 0 | 0 | 1 | 0 | 1 | 1 | 1 | 1 | 0 | 0 | 1 | 1 | 363 | RETRACT RPM OFF | STOP |
| 23 | 0 | 1 | 0 | 0 | 1 | 1 | 1 | 1 | 1 | 1 | 0 | 0 | 1 | 1 | 363 | RETRACT RPM OFF | STOP |
| 24 | 0 | 1 | 0 | 1 | 0 | 0 | 1 | 1 | 1 | 1 | 0 | 0 | 1 | 1 | 363 | RETRACT RPM OFF | STOP |
| 25 | 0 | 1 | 0 | 1 | 0 | 1 | 1 | 1 | 1 | 1 | 0 | 0 | 1 | 1 | 363 | RETRACT RPM OFF | STOP |
| 26 | 0 | 1 | 0 | 1 | 1 | 0 | 1 | 1 | 1 | 1 | 0 | 0 | 1 | 1 | 363 | RETRACT RPM OFF | STOP |
| 27 | 0 | 1 | 0 | 1 | 1 | 1 | 0 | 0 | 0 | 0 | 0 | 0 | 0 | 0 | 000 | NOT USED | — |
| 30 | 0 | 1 | 1 | 0 | 0 | 0 | 0 | 0 | 0 | 0 | 0 | 0 | 0 | 0 | 000 | NOT USED | — |
| 31 | 0 | 1 | 1 | 0 | 0 | 1 | 0 | 0 | 0 | 0 | 0 | 0 | 0 | 0 | 000 | NOT USED | — |
| 32 | 0 | 1 | 1 | 0 | 1 | 0 | 0 | 0 | 0 | 0 | 0 | 0 | 0 | 0 | 000 | NOT USED | — |
| 33 | 0 | 1 | 1 | 0 | 1 | 1 | 0 | 0 | 0 | 0 | 0 | 0 | 0 | 0 | 000 | NOT USED | — |
| 34 | 0 | 1 | 1 | 1 | 0 | 0 | 0 | 0 | 0 | 0 | 0 | 0 | 0 | 0 | 000 | NOT USED | — |
| 35 | 0 | 1 | 1 | 1 | 0 | 1 | 0 | 0 | 0 | 0 | 0 | 0 | 0 | 0 | 000 | NOT USED | — |
| 36 | 0 | 1 | 1 | 1 | 1 | 0 | 0 | 0 | 0 | 0 | 0 | 0 | 0 | 0 | 000 | NOT USED | — |
| 37 | 0 | 1 | 1 | 1 | 1 | 1 | 0 | 0 | 0 | 0 | 0 | 0 | 0 | 0 | 000 | NOT USED | — |
| 40 | 1 | 0 | 0 | 0 | 0 | 0 | 0 | 1 | 1 | 1 | 0 | 0 | 1 | 1 | 163 | RETRACT RPM ON | STOP |
| 41 | 1 | 0 | 0 | 0 | 0 | 1 | 0 | 1 | 1 | 1 | 0 | 0 | 0 | 1 | 161 | RETRACT RPM ON | HOLD |
| 42 | 1 | 0 | 0 | 0 | 1 | 0 | 0 | 1 | 1 | 1 | 0 | 0 | 0 | 1 | 161 | RETRACT RPM ON | HOLD |
| 43 | 1 | 0 | 0 | 0 | 1 | 1 | 0 | 1 | 1 | 1 | 0 | 0 | 0 | 1 | 161 | RETRACT RPM ON | HOLD |
| 44 | 1 | 0 | 0 | 1 | 0 | 0 | 0 | 0 | 0 | 0 | 0 | 0 | 0 | 0 | 000 | NOT USED | — |
| 45 | 1 | 0 | 0 | 1 | 0 | 1 | 0 | 0 | 0 | 0 | 0 | 0 | 0 | 0 | 000 | NOT USED | — |
| 46 | 1 | 0 | 0 | 1 | 1 | 0 | 0 | 0 | 0 | 0 | 0 | 0 | 0 | 0 | 000 | NOT USED | — |
| 47 | 1 | 0 | 0 | 1 | 1 | 1 | 0 | 0 | 0 | 0 | 0 | 0 | 0 | 0 | 000 | NOT USED | — |
| 50 | 1 | 0 | 1 | 0 | 0 | 0 | 0 | 1 | 1 | 1 | 0 | 0 | 1 | 1 | 163 | RETRACT RPM ON | STOP |
| 51 | 1 | 0 | 1 | 0 | 0 | 1 | 0 | 1 | 1 | 1 | 0 | 0 | 0 | 1 | 161 | RETRACT RPM ON | HOLD |
| 52 | 1 | 0 | 1 | 0 | 1 | 0 | 0 | 1 | 1 | 1 | 0 | 0 | 0 | 1 | 161 | RETRACT RPM ON | HOLD |
| 53 | 1 | 0 | 1 | 0 | 1 | 1 | 0 | 0 | 0 | 0 | 0 | 0 | 0 | 0 | 000 | NOT USED | — |
| 54 | 1 | 0 | 1 | 1 | 0 | 0 | 0 | 0 | 0 | 0 | 0 | 0 | 0 | 0 | 000 | NOT USED | — |
| 55 | 1 | 0 | 1 | 1 | 0 | 1 | 0 | 0 | 0 | 0 | 0 | 0 | 0 | 0 | 000 | NOT USED | — |
| 56 | 1 | 0 | 1 | 1 | 1 | 0 | 0 | 0 | 0 | 0 | 0 | 0 | 0 | 0 | 000 | NOT USED | — |

TABLE 5-continued

| | ROM INPUTS | | | | | | | ROM OUTPUTS | | | | | | | | |
|---|---|---|---|---|---|---|---|---|---|---|---|---|---|---|---|---|
| OCTAL ADDRESS Pin No. Desig. | RETRACT (ON) 10 F | RETRACT (OFF) 9 E | R. ADVANCE 8 D | ROTATE 5 C | RUN 4 B | HOLD 3 A | RPM 15 Y8 | FEED 16 Y7 | SOL M-7 17 Y6 | SOL M-4 18 Y5 | SOL M-3 & 6 19 Y4 | UNUSED 20 Y3 | HOLD 21 Y2 | RUN 22 Y1 | Output Code | Functions | Exit |
| 57 | 1 | 0 | 1 | 1 | 1 | 1 | 0 | 0 | 0 | 0 | 0 | 0 | 0 | 0 | 000 | NOT USED | |
| 60 | 1 | 1 | 0 | 0 | 0 | 0 | 0 | 0 | 0 | 0 | 0 | 0 | 0 | 0 | 000 | NOT USED | |
| 61 | 1 | 1 | 0 | 0 | 0 | 1 | 0 | 0 | 0 | 0 | 0 | 0 | 0 | 0 | 000 | NOT USED | |
| 62 | 1 | 1 | 0 | 0 | 1 | 0 | 0 | 0 | 0 | 0 | 0 | 0 | 0 | 0 | 000 | NOT USED | |
| 63 | 1 | 1 | 0 | 0 | 1 | 1 | 0 | 0 | 0 | 0 | 0 | 0 | 0 | 0 | 000 | NOT USED | |
| 64 | 1 | 1 | 0 | 1 | 0 | 0 | 0 | 0 | 0 | 0 | 0 | 0 | 0 | 0 | 000 | NOT USED | |
| 65 | 1 | 1 | 0 | 1 | 0 | 1 | 0 | 0 | 0 | 0 | 0 | 0 | 0 | 0 | 000 | NOT USED | |
| 66 | 1 | 1 | 0 | 1 | 1 | 0 | 0 | 0 | 0 | 0 | 0 | 0 | 0 | 0 | 000 | NOT USED | |
| 67 | 1 | 1 | 0 | 1 | 1 | 1 | 0 | 0 | 0 | 0 | 0 | 0 | 0 | 0 | 000 | NOT USED | |
| 70 | 1 | 1 | 1 | 0 | 0 | 0 | 0 | 0 | 0 | 0 | 0 | 0 | 0 | 0 | 000 | NOT USED | |
| 71 | 1 | 1 | 1 | 0 | 0 | 1 | 0 | 0 | 0 | 0 | 0 | 0 | 0 | 0 | 000 | NOT USED | |
| 72 | 1 | 1 | 1 | 0 | 1 | 0 | 0 | 0 | 0 | 0 | 0 | 0 | 0 | 0 | 000 | NOT USED | |
| 73 | 1 | 1 | 1 | 0 | 1 | 1 | 0 | 0 | 0 | 0 | 0 | 0 | 0 | 0 | 000 | NOT USED | |
| 74 | 1 | 1 | 1 | 1 | 0 | 0 | 0 | 0 | 0 | 0 | 0 | 0 | 0 | 0 | 000 | NOT USED | |
| 75 | 1 | 1 | 1 | 1 | 0 | 1 | 0 | 0 | 0 | 0 | 0 | 0 | 0 | 0 | 000 | NOT USED | |
| 76 | 1 | 1 | 1 | 1 | 1 | 0 | 0 | 0 | 0 | 0 | 0 | 0 | 0 | 0 | 000 | NOT USED | |
| 77 | 1 | 1 | 1 | 1 | 1 | 1 | 0 | 0 | 0 | 0 | 0 | 0 | 0 | 0 | 000 | NOT USED | |

DRILL FUNCTION CONTROL ROM CODING

Lines 304, 305 and 306 energize driver for solenoids 3, 4, 6, and 7. Lines 307 and 308 provide enable signals for the feed servo controller and the spindle motor servo controller in FIG. 6. The Stop Function is controlled by two OR-gates 312 and 313 and an AND-gate 314. The OR-gate 312 provides an output when the Stop switch 274 is energized or in response to AND-gate 314. The AND-gate is operated in response to an Auto enab signal at 316 from FIG. 13 and a stop signal from the computer at input 318. The OR-gate 313 provides an output from a Master Lockout signal at 320, a Reset signal at 322 or in response to an output from ORgate 312. A signal at either terminal 331 or 333 or ROM 270 will provide a disable signal shown on Table 5.

Figure 9:
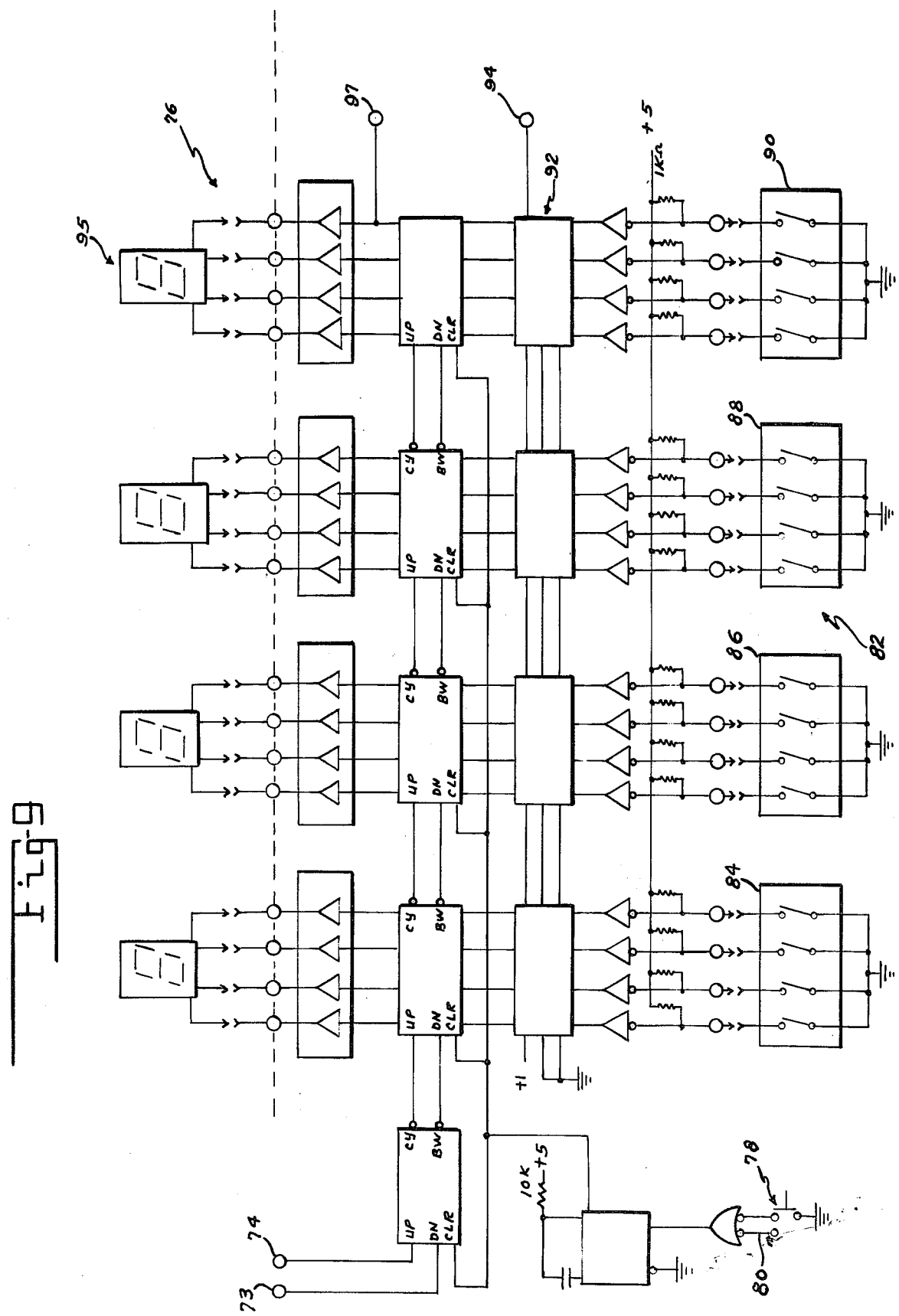
FIG. 9 is a schematic diagram of a position counter and display for the device of FIG. 6.

The circuitry shown at 324 acts to automatically retract the drill if an absolute stroke limit signal is received on line 303' from line 104 in FIG. 6 or in response to inputs 94 and 97 from FIG. 9 corresponding to the thickness limit set by the thumb wheels and a most significant digit signal from the counter together with an input on line 317 from FIG. 13. This is made functional only while a feed signal is supplied to input 311 so that the system will not go into rapid retract from rapid advance, should one of the limits be passed before the limit switches have been set for the particular hole being drilled. The signal at 333 is a momentary input while a signal appears on line 337 so that when the signal on line 303' or the output of and gate 338 passes the ROM 270 goes to the state shown at Octal Address 20 with a rapid retract RPM OFF input from flip-flop 339 to OR-gate 326. A zero index pulse input at 328 from the linear encoder unlatches the flip-flop 339 removing the signal from OR-gate 326 to cause the ROM to revert to the stop state as indicated at the Octal addresses 0. An input on lines 334, 335 or 336 will also act to unlatch the flip-flop 339 and cause the ROM to revert to the corresponding latched state. The output on line 248' in FIG. 13 was not used in the present equipment. The output on line 249' is a computer sense input line and only tells the computer if this line is high or low.

The inputs on lines 287-291 to the computer also provide inputs on lines 287L, 288L, 289L, 290L and 291L to a 74186 Read only memory 292 in FIG. 13. The outputs on lines 202L, 204L, 206L, 208L, 210L, 212L, 273L, 274L, 275L, 276L, 277L, 278L and 279L and as indicated by line 105L, in FIG. 6 are supplies to conventional drivers for lamps on buttons 202, 204, 206, 208, 210, 212, 273-279 on the board of FIG. 7.

Table 6 shows the outputs of the ROM 292 corresponding to the inputs on lines 287L-291L.

TABLE 6

|    |              | DS#7 31 | DS#3.6 29 | DSRPM 33 | DSFEED 32 | DS#4 30 |
|----|--------------|---------|-----------|----------|-----------|---------|
| 0  | RETRACT (OFF)| 0       | 0         | 0        | 0         | 0       |
| 1  |              | 0       | 0         | 0        | 0         | 1       |
| 2  |              | 0       | 0         | 0        | 1         | 0       |
| 3  |              | 0       | 0         | 0        | 1         | 1       |
| 4  | RETRACT (ON) | 0       | 0         | 1        | 0         | 0       |
| 5  |              | 0       | 0         | 1        | 0         | 1       |
| 6  |              | 0       | 0         | 1        | 1         | 0       |
| 7  |              | 0       | 0         | 1        | 1         | 1       |
| 8  | STOP         | 0       | 1         | 0        | 0         | 0       |
| 9  |              | 0       | 1         | 0        | 0         | 1       |
| 10 |              | 0       | 1         | 0        | 1         | 0       |
| 11 |              | 0       | 1         | 0        | 1         | 1       |
| 12 | HOLD         | 0       | 1         | 1        | 0         | 0       |
| 13 |              | 0       | 1         | 1        | 0         | 1       |
| 14 |              | 0       | 1         | 1        | 1         | 0       |
| 15 |              | 0       | 1         | 1        | 1         | 1       |
| 16 |              | 1       | 0         | 0        | 0         | 0       |
| 17 |              | 1       | 0         | 0        | 0         | 1       |
| 18 |              | 1       | 0         | 0        | 1         | 0       |
| 19 |              | 1       | 0         | 0        | 1         | 1       |
| 20 |              | 1       | 0         | 1        | 0         | 0       |
| 21 |              | 1       | 0         | 1        | 0         | 1       |
| 22 |              | 1       | 0         | 1        | 1         | 0       |
| 23 |              | 1       | 0         | 1        | 1         | 1       |
| 24 |              | 1       | 1         | 0        | 0         | 0       |
| 25 | RAP. ADVANCE | 1       | 1         | 0        | 0         | 1       |
| 26 |              | 1       | 1         | 0        | 1         | 0       |
| 27 |              | 1       | 1         | 0        | 1         | 1       |
| 28 |              | 1       | 1         | 1        | 0         | 0       |
| 29 | RAP. ADVANCE | 1       | 1         | 1        | 0         | 1       |
| 30 | RUN          | 1       | 1         | 1        | 1         | 0       |
| 31 |              | 1       | 1         | 1        | 1         | 1       |
|    | DISABLED     | X       | X         | X        | X         | X       |

|    |              | RETRACT OFF 9 | RETRACT ON 7 | STOP 6 | HOLD 5 | RUN 4 | RAPID ADVANCE 3 | ROTATE 2 | 1 |
|----|--------------|---------------|--------------|--------|--------|-------|-----------------|----------|---|
| 0  | RETRACT (OFF)| 0             | 1            | 1      | 1      | 1     | 1               | 1        | 0 |
| 1  |              | 1             | 1            | 1      | 1      | 1     | 1               | 1        | 0 |
| 2  |              | 1             | 1            | 1      | 1      | 1     | 1               | 1        | 0 |
| 3  |              | 1             | 1            | 1      | 1      | 1     | 1               | 1        | 0 |
| 4  | RETRACT (ON) | 1             | 0            | 1      | 1      | 1     | 1               | 0        | 0 |
| 5  |              | 1             | 1            | 1      | 1      | 1     | 1               | 1        | 0 |
| 6  |              | 1             | 1            | 1      | 1      | 1     | 1               | 1        | 0 |
| 7  |              | 1             | 1            | 1      | 1      | 1     | 1               | 1        | 0 |
| 8  | STOP         | 1             | 1            | 0      | 1      | 1     | 1               | 1        | 0 |
| 9  |              | 1             | 1            | 1      | 1      | 1     | 1               | 1        | 0 |
| 10 |              | 1             | 1            | 1      | 1      | 1     | 1               | 1        | 0 |

TABLE 6-continued

| | | | | | | | | |
|---|---|---|---|---|---|---|---|---|
| 11 | | 1 | 1 | 1 | 1 | 1 | 1 | 1 | 0 |
| 12 | HOLD | 1 | 1 | 1 | 0 | 1 | 1 | 0 | 0 |
| 13 | | 1 | 1 | 1 | 1 | 1 | 1 | 1 | 0 |
| 14 | | 1 | 1 | 1 | 1 | 1 | 1 | 1 | 0 |
| 15 | | 1 | 1 | 1 | 1 | 1 | 1 | 1 | 0 |
| 16 | | 1 | 1 | 1 | 1 | 1 | 1 | 1 | 0 |
| 17 | | 1 | 1 | 1 | 1 | 1 | 1 | 1 | 0 |
| 18 | | 1 | 1 | 1 | 1 | 1 | 1 | 1 | 0 |
| 19 | | 1 | 1 | 1 | 1 | 1 | 1 | 1 | 0 |
| 20 | | 1 | 1 | 1 | 1 | 1 | 1 | 1 | 0 |
| 21 | | 1 | 1 | 1 | 1 | 1 | 1 | 1 | 0 |
| 22 | | 1 | 1 | 1 | 1 | 1 | 1 | 1 | 0 |
| 23 | | 1 | 1 | 1 | 1 | 1 | 1 | 1 | 0 |
| 24 | | 1 | 1 | 1 | 1 | 1 | 1 | 1 | 0 |
| 25 | RAP. ADVANCE | 1 | 1 | 1 | 1 | 1 | 0 | 1 | 0 |
| 26 | | 1 | 1 | 1 | 1 | 1 | 1 | 1 | 0 |
| 27 | | 1 | 1 | 1 | 1 | 1 | 1 | 1 | 0 |
| 28 | | 1 | 1 | 1 | 1 | 1 | 1 | 1 | 0 |
| 29 | RAP. ADVANCE | 1 | 1 | 1 | 1 | 1 | 0 | 0 | 0 |
| 30 | RUN | 1 | 1 | 1 | 1 | 0 | 1 | 0 | 0 |
| 31 | | 1 | 1 | 1 | 1 | 1 | 1 | 1 | 0 |
| | DISABLED | 1 | 1 | 1 | 1 | 1 | 1 | 1 | 0 |

LAMP DECODE PROM PROGRAMMING

FIG. 17 shows the operation of switches 67 and 112 in FIG. 6. The output of F/V converter 62 and inverter 61 are applied to summer 64 as described with respect to FIGS. 6 and 8 and the output of F/V converter 116 is applied to the summer 117, not shown in FIG. 10, in the motor servo controller 122 as described with respect to FIGS. 6 and 10. A signal on line 340 from when the Auto switch 208 in FIG. 7 is operated closes the switches to 342 and 344 to provide computer control of the servo controllers 66 and 122. A signal on line 345 when the manual switch 204, in FIG. 7, is operated closes switches 347 and 349 to the manual potentiometers 68 and 124. Switch 350 is closed in response to a signal on line 309, FIG. 15, which shorts the capacitor 352 so that a drive signal cannot be generated if the drill is in any state except the drill run state. The switch 353 is opened in response to a signal on line 310 in FIG. 15 to remove the short from capacitor 354, which is shorted to prevent the generation of a drive signal in any state not requiring spindle rotation.

In the operation of the device of the invention, the system can be operated in the Manual mode, the Auto mode wherein the computer controls the operation and in the Monitor mode wherein the drill is operated manually with alert signals being provided by the computer. The Adapt mode is not functional in the present system.

In the manual operation of the system, the power to the electronics and computer are switched on and the hydraulic power supply is activated.

The operator then selects the proper feeds and speeds for the material and drill size, for example as shown in Table 1. The Reset button and then the Manual button are pressed to obtain the responses in ROM 201 as shown in Table 3 as indicated in FIG. 14. The Rotate button is then pressed and the RPM potentiometer 124 is adjusted to provide the correct spindle speed for the material and drill size. When the proper speed is obtained the Rotate button is released. The Run button is then pushed to adjust the feed rate potentiometer 68 to the desired IPR rate. Since the feed rate adjust potentiometer is controlling inches per revolution, the RPM must be adjusted first. Changing the RPM will require the feed rate to be adjusted again. The Rapid Advance button is then depressed to advance the drill to the work surface. The position counter is then reset to zero by pressing the Reset button 78. The position limit thumb wheels 82 are then set for the stock thickness plus the values given below:

| Drill Diameter | | |
|---|---|---|
| ½" | 1" | 1¼" |
| 0.15 | 0.20 | 0.32 |

The Run button is then depressed to commence the drilling operation with cutting fluid being supplied to the drill. The Torque and Thrust displays are observed to determine chip buildup and dull drill indications. The drill can be retracted on any time by pressing the Retract RPM ON button or the Retract RPM OFF button for clearing chips. The position counter will count a negative number. The counter reset button should not be depressed or the position information will be lost.

To restart the drill, the rapid advance button and Run button are depressed as described above. If the drills are changed, the difference in lengths of the new and old drills should be added or subtracted on the Position Limit Switches. When the position counter reaches the limit set in the Position Limit Thumbwheels, the drill will retract with rotation and will stop when fully retracted.

Feed rate changes may be made when changes of material are encountered in the stack. Since changing the speed affects the feed rate, the speed can be set for the most difficult material in the stack and then not changed when the feed rates are changed. When the change in material is soft/hard, the change in feed and speed are made when the drill point is at the interface. When the change is hard/soft, the changes in feed and speed are made when the drill outer corners are at the interface.

In automatic operation of the drill, the power is turned on and the Reset and Manual buttons are depressed as in manual operation. The Auto button is then depressed. In the device constructed, the computer was programmed for different hole sizes and different material sequences. For the purpose of this invention, it will be assumed that the computer has been programmed for a particular drill size and material stack and that this hole has been selected for drilling. The Run button is then depressed to start the drilling operation, with cutting fluid supplied. The drill will rapid advance to the work surface. When a thrust buildup of 100 lbs is sensed, the computer is programmed to actuate the appropriate speed and feed and reset the position counter to zero. When the drill approaches an interface, the speeds and feeds are automatically changed.

If torque or thrust exceed specific limitations programmed into the computer, the drill will automatically retract with rotation and signal Chip Pack on line 315L in FIG. 6 to provide a light signal at 315 on the panel in FIG. 7. After retraction for 6 sec, the drill will automatically rapid advance and search for the point where drilling stopped. If it reaches that point before thrust buildup reaches 100 pounds, indicating no chips in the way, the drilling operation is continued. If chips are encountered, the drill will retract and stop and signal that the chips should be cleared. After chips are cleared and the drill is started by depressing the Run button, if the drill encounters excessive torque or thrust before 10 sec have elapsed, the drilling operation is stopped and the dull drill signal on lines 317L for the light 317 on the display panel in FIG. 7 and an alarm signal on line 317A. A switch 319 opens the alarm circuit.

When the hole is complete, the drill unit will automatically retract and reset the absolute position counter to zero.

In Monitor mode operation, the drill is started as in Auto mode except that the Monitor button is depressed instead of the Auto button. After the proper hole and materials are selected in the computer, the drill is operated as in the Manual mode. However, in this mode the computer will provide signals for corrective action. Even though the drill is advanced to the work surface and the position limit is set as in manual operation, the computer will determine the work surface zero position by monitoring thrust buildup, as described above.

There is thus provided a drill for drilling multilayer materials which provides more accurate drill position and which can be operated in a manual mode, an automatic mode or in a monitor mode.

I claim:

1. An apparatus in combination with a drill, having a drill frame member and a drill feed housing which is movable with respect to the frame member; a system for providing a signal proportional to the net rate of travel of the drill feed housing with respect to the frame member, comprising: a linear incremental encoder, adapted to provide a predetermined number of pulses per inch of forward travel of the drill feed housing with respect to the frame member and a predetermined number of pulses per inch of reverse travel of the drill feed housing and a pulse signal indicating a substantially fully retracted position of the drill feed housing; said encoder having a linear scale secured to said drill feed housing and an encoder head secured to said frame member; a first frequency to voltage converter, responsive to pulses related to forward travel of said feed housing; a second frequency to voltage converter, responsive to pulses related to reverse travel of said feed housing; means for inverting the output of one of said frequency to voltage converters; a first summing circuit; means for connecting the inverted output of said one frequency to voltage converter to said summing circuit; means for connecting the output of the other frequency to voltage converter to said summing circuit to provide a signal proportional to net feed rate of the drill feed housing with respect to the drill frame member.

2. The device as recited in claim 1 wherein said drill is a hydraulic drill having a hydraulic motor driven spindle and a hydraulic piston driven feed; a hydraulic supply; means, including a first servo valve, connected between the hydraulic supply and said hydraulic motor for controlling the rotation of said spindle; means, including a second servo valve, connected between the hydraulic supply and said hydraulic piston, for controlling the drill feed; said means for controlling the rotation of said spindle including a first servo controller, connected to said first servo valve; said first servo controller including a second summing circuit; said spindle having a plurality of angularly spaced slots around the spindle; a magnetic pickup, adjacent said spindle, adapted to provide two square wave signals offset 90° proportional to the rotational speed of said spindle past said magnetic pickup; means responsive to said square wave signals for providing a first input to said second summing circuit; means for providing a control input signal to said second summing circuit to provide an error signal to the first servo controller to thereby control the spindle rotational speed; said means, for controlling the drill feed including a second servo controller connected to said second servo valve; said second servo controller including a third summing circuit; means, responsive to the output of said first summing for providing a first input to said third summing circuit; means for providing a control input signal to said third summing circuit to provide an error signal to the second servo controller to thereby control the drill feed.

3. The device as recited in claim 2, including, means, responsive to the pressure across the hydraulic motor, for providing a signal proportional to torque on said motor; means, responsive to said torque signal for providing a display of the torque on said motor; means, responsive to the pressure across hydraulic piston, for providing a signal proportional to thrust of said feed of the hydraulic piston; means responsive to said thrust signal for providing a display of thrust of said hydraulic piston; means responsive to the outputs of said linear encoder for providing a display of the position of the drill feed housing with respect to the drill frame member; means, responsive to the outputs of the linear encoder and said square wave signals for providing a display of inches of travel of the feed per revolution of the spindle; means for resetting said position display to zero whereby the travel of the drill feed from a predetermined position can be indicated on the display.

4. The device as recited in claim 3 including a normally open solenoid valve connected between said hydraulic supply and downward side of said hydraulic piston, a second normally closed solenoid valve connected between said hydraulic supply and the upward side of said hydraulic piston; a third normally open solenoid valve connected between the upward side of the hydraulic piston and the hydraulic return line; a fourth normally closed solenoid valve connected between the downward side of the hydraulic piston and the hydraulic return line; means for selectively energizing the first, second, third and fourth solenoid valves for rapidly advancing the drill and means for selectively deenergizing the first, second, third and fourth solenoid valves for rapidly retracting the drill; means for selectively energizing first, third and fourth solenoid valves together with said hydraulic piston to permit normal advance of said drill.

5. The device as recited in claim 4 including a computer programmed to provide computer control feed signals and computer control speed signals corresponding to known recommended feeds and speed for a plurality of materials in a stack for a given drill size; and programmed to sense torque and thrust and to provide an output signal when torque or thrust exceed known recommended levels; means, responsive to said first frequency to voltage converter and said second frequency to voltage converter for providing a drill feed position signal to said computer; means responsive to said square wave signals for providing a spindle speed signal to said computer; means responsive to said torque signal for providing a signal proportional to torque to said computer; means responsive to said thrust signal for providing a signal proportional to thrust to said computer; a first manually operable potentiometer, adapted to provide a control feed signal; a second manually operable potentiometer, adapted to provide a control speed signal; means for selectively supplying said potentiometer control feed signal or the computer control feed signal to said second summing circuit and means for selectively supplying said potentiometer control speed signal or the computer control speed signal to said third summing; a pulse counter responsive to the output of said first frequency to voltage converter and said second frequency to voltage converter for providing a signal proportional to the position of the drill feed housing with respect to the drill frame member; means for supplying the pulse signal indicating a fully retracted drill to said counter to reset the counter when the drill is fully retracted to thereby provide an absolute drill displacement signal; means for supplying said absolute displacement signal to said computer; means, for switching the drill control between manual operation; automatic computer control operation or manual control with computer monitor operation.

6. The method of drilling through a multi-material stack with a hydraulic drill, comprising: controlling the forward and reverse movements of a drill with a hydraulic feed cylinder; measuring the forward and reverse movements of the hydraulic drill feed cylinder with a linear encoder; subtracting a signal proportional to the reverse movement from a signal proportional to the forward movement to obtain a net feed rate signal; comparing the net feed rate signal with a common feed rate signal proportional to the desired feed rate for each material in the stack, to obtain an error signal; controlling the rotation of the drill with a hydraulic spindle motor; measuring the hydraulic spindle speed with a slotted spindle and a magnetic pickup; comparing a signal proportional to spindle speed signal obtained from said magnetic pickup with a command speed signal proportional to the desired speeds for the materials in the stack measuring the differential pressure across the feed piston to obtain a signal proportional to thrust; measuring the differential pressure across the spindle drive to obtain a signal proportional to torque, retracting the drill in response to an increase in thrust or torque, above predetermined levels.

* * * * *

UNITED STATES PATENT AND TRADEMARK OFFICE
CERTIFICATE OF CORRECTION

PATENT NO. : 4,157,231
DATED : June 5, 1979
INVENTOR(S) : Joseph L. Phillips

It is certified that error appears in the above–identified patent and that said Letters Patent are hereby corrected as shown below:

In the Abstract, line 6 change "encoded" to --- encoder ---;

Column 5, line 47, change "counters" to --- counter ---;

Columns 13 and 14, Table 5, change the OCTAL ADDRESS (0) zero line immediately below the Disabled line from

"0    0  0  0  0  0  1   1  1  1  1  0  1  1   373    STOP   —"

to

--- 0    0  0  0  0  0  0   1  1  1  1  1  0  1  1    373    STOP   — ---;

Claim 6, line 18, insert a semicolon (;) after "stack".

*Signed and Sealed this*

*Twenty-seventh* Day of *November 1979*

[SEAL]

*Attest:*

RUTH C. MASON
*Attesting Officer*

LUTRELLE F. PARKER
*Acting Commissioner of Patents and Trademarks*